United States Patent
Xu et al.

[11] Patent Number: 5,874,668
[45] Date of Patent: Feb. 23, 1999

[54] ATOMIC FORCE MICROSCOPE FOR BIOLOGICAL SPECIMENS

[75] Inventors: Shaohua Xu; Morton F. Arnsdorf, both of Chicago, Ill.

[73] Assignee: Arch Development Corporation, Chicago, Ill.

[21] Appl. No.: 547,521

[22] Filed: Oct. 24, 1995

[51] Int. Cl.⁶ ........................................ G01B 5/28
[52] U.S. Cl. ........................................... 73/105
[58] Field of Search ................. 73/105; 250/306

[56] References Cited

U.S. PATENT DOCUMENTS

| | | |
|---|---|---|
| Re. 33,387 | 10/1990 | Binnig . |
| Re. 34,331 | 8/1993 | Elings et al. . |
| Re. 34,489 | 12/1993 | Hansma et al. . |
| Re. 34,708 | 8/1994 | Hansma et al. . |
| 4,724,318 | 2/1988 | Binnig . |
| 4,800,274 | 1/1989 | Hansma et al. . |
| 4,851,671 | 7/1989 | Pohl . |
| 4,935,634 | 6/1990 | Hansma et al. . |
| 5,003,815 | 4/1991 | Martin et al. . |
| 5,015,850 | 5/1991 | Zdeblick et al. . |
| 5,019,707 | 5/1991 | Chiu et al. . |
| 5,021,364 | 6/1991 | Akamine et al. . |
| 5,025,153 | 6/1991 | Okada et al. . |
| 5,025,658 | 6/1991 | Elings et al. . |
| 5,036,196 | 7/1991 | Hosaka et al. . |
| 5,038,034 | 8/1991 | Fujita . |
| 5,038,322 | 8/1991 | Van Loenen . |
| 5,041,783 | 8/1991 | Ohta et al. . |
| 5,043,577 | 8/1991 | Pohl et al. . |
| 5,043,578 | 8/1991 | Güethner et al. . |
| 5,047,633 | 9/1991 | Finlan et al. . |
| 5,047,637 | 9/1991 | Toda . |
| 5,047,649 | 9/1991 | Hodgson et al. . |
| 5,051,379 | 9/1991 | Bayer et al. . |
| 5,055,679 | 10/1991 | Ninomiya et al. . |
| 5,055,680 | 10/1991 | Kesmodel et al. . |
| 5,060,248 | 10/1991 | Dumoulin . |
| 5,065,103 | 11/1991 | Slinkman et al. . |
| 5,066,358 | 11/1991 | Quate et al. . |
| 5,103,174 | 4/1992 | Wandass et al. . |
| 5,106,729 | 4/1992 | Lindsay et al. . |
| 5,107,114 | 4/1992 | Nishioka et al. . |
| 5,120,959 | 6/1992 | Tomita . |
| 5,138,159 | 8/1992 | Takase et al. . |
| 5,144,128 | 9/1992 | Hasegawa et al. . |
| 5,144,833 | 9/1992 | Amer et al. . |
| 5,150,392 | 9/1992 | Hohn et al. . |
| 5,153,434 | 10/1992 | Yajima et al. . |
| 5,155,359 | 10/1992 | Monahan . |
| 5,157,251 | 10/1992 | Albrecht et al. . |
| 5,164,595 | 11/1992 | Musselman et al. . |
| 5,166,516 | 11/1992 | Kajimura . |
| 5,166,520 | 11/1992 | Prater et al. . |
| 5,171,992 | 12/1992 | Clabes et al. . |
| 5,186,789 | 2/1993 | Tsuda et al. . |
| 5,189,906 | 3/1993 | Elings et al. . |

(List continued on next page.)

OTHER PUBLICATIONS

Hoh et al., "Atomic Force Microscopy For High-Resolution in Cell Biology", Miscellenean.

Nakagawa et al., "Discriminating Molecular Length of Chemically Adsorbed Molecules Using an Atomic Force Microscope Having a Tip Covered With Sensor Molecules (An Atomic Force Microscope Having Chemical Sensing Function).", Jpn. J. Appl. Phys. vol. 32, Part 2, No. 213, 15 Feb. 1993, pp. L294–L296.

Specht et al., "Simultaneous Measurement of Tunneling Current and Force As a Function of Position Through a Lipid Film on a Solid Substrate", Surface Science Letters, vol. 257, 1991, pp. L653–L658.

*Primary Examiner*—Hezron E. Williams
*Assistant Examiner*—Daniel S. Larkin
*Attorney, Agent, or Firm*—Michael D. Rechtin; Foley & Lardner

[57] ABSTRACT

An atomic force microscope for quantitative imaging and identification, at the molecular or submolecular level, biomolecules or subunits of biomolecules in a physiologic environment, through use of a cantilever tip incorporating a biomolecular identifier.

11 Claims, 22 Drawing Sheets

U.S. PATENT DOCUMENTS

| | | |
|---|---|---|
| 5,193,383 | 3/1993 | Burnham et al. . |
| 5,193,385 | 3/1993 | Nishioka et al. . |
| 5,196,701 | 3/1993 | Foster et al. . |
| 5,200,616 | 4/1993 | Kokawa et al. . |
| 5,201,992 | 4/1993 | Marcus et al. . |
| 5,202,004 | 4/1993 | Kwak et al. . |
| 5,204,581 | 4/1993 | Andreadakis et al. . |
| 5,206,702 | 4/1993 | Kato et al. . |
| 5,210,410 | 5/1993 | Barrett . |
| 5,210,425 | 5/1993 | Delawski et al. . |
| 5,210,636 | 5/1993 | Baer . |
| 5,211,006 | 5/1993 | Sohnly . |
| 5,214,279 | 5/1993 | Hakamata . |
| 5,214,342 | 5/1993 | Yang . |
| 5,216,631 | 6/1993 | Sliwa, Jr. . |
| 5,224,376 | 7/1993 | Elings et al. . |
| 5,229,606 | 7/1993 | Elings et al. . |
| 5,237,859 | 8/1993 | Elings et al. . |
| 5,239,863 | 8/1993 | Kado et al. . |
| 5,245,863 | 9/1993 | Kajimura et al. . |
| 5,252,835 | 10/1993 | Lieber et al. . |
| 5,253,516 | 10/1993 | Elings et al. . |
| 5,254,854 | 10/1993 | Betzig . |
| 5,260,567 | 11/1993 | Kuroda et al. . |
| 5,260,824 | 11/1993 | Okada et al. . |
| 5,260,926 | 11/1993 | Kuroda et al. . |
| 5,266,801 | 11/1993 | Elings et al. . |
| 5,267,471 | 12/1993 | Abraham et al. . |
| 5,276,672 | 1/1994 | Miyazaki et al. . |
| 5,283,442 | 2/1994 | Martin et al. . |
| 5,291,775 | 3/1994 | Gamble et al. . |
| 5,293,042 | 3/1994 | Miyamoto . |
| 5,293,781 | 3/1994 | Kaiser et al. . |
| 5,294,804 | 3/1994 | Kajimura . |
| 5,296,704 | 3/1994 | Mishima . |
| 5,298,975 | 3/1994 | Khoury . |
| 5,302,239 | 4/1994 | Roe et al. . |
| 5,304,924 | 4/1994 | Yamano et al. . |
| 5,306,467 | 4/1994 | Douglas-Hamilton et al. . |
| 5,307,311 | 4/1994 | Sliwa, Jr. . |
| 5,307,693 | 5/1994 | Griffith et al. . |
| 5,308,974 | 5/1994 | Elings et al. . |
| 5,313,451 | 5/1994 | Yagi et al. . |
| 5,317,141 | 5/1994 | Thomas . |
| 5,317,152 | 5/1994 | Takamatsu et al. . |
| 5,317,533 | 5/1994 | Quate et al. . |
| 5,319,960 | 6/1994 | Gamble et al. . |
| 5,319,977 | 6/1994 | Quate et al. . |
| 5,321,685 | 6/1994 | Nose et al. . |
| 5,321,977 | 6/1994 | Clabes et al. . |
| 5,323,003 | 6/1994 | Shido et al. . |
| 5,329,122 | 7/1994 | Sakai et al. . |
| 5,329,808 | 7/1994 | Elings et al. . |
| 5,336,369 | 8/1994 | Kado et al. . |
| 5,336,882 | 8/1994 | Fooks et al. . |
| 5,336,887 | 8/1994 | Yagi et al. . |
| 5,338,932 | 8/1994 | Theodore et al. . |
| 5,345,815 | 9/1994 | Albrecht et al. . |
| 5,345,816 | 9/1994 | Clabes et al. . |
| 5,347,854 | 9/1994 | Martin et al. . |
| 5,348,638 | 9/1994 | Nakagawa ................................ 205/122 |
| 5,353,632 | 10/1994 | Nakagawa .................................. 73/105 |
| 5,354,985 | 10/1994 | Quate . |
| 5,356,218 | 10/1994 | Hopson et al. . |
| 5,357,105 | 10/1994 | Harp et al. . |
| 5,357,108 | 10/1994 | Suzuki et al. . |
| 5,357,109 | 10/1994 | Kusumoto . |
| 5,357,787 | 10/1994 | Kado et al. . |
| 5,360,977 | 11/1994 | Onuki et al. . |
| 5,363,697 | 11/1994 | Nakagawa .................................. 73/105 |
| 5,367,165 | 11/1994 | Toda et al. . |
| 5,371,365 | 12/1994 | Watanabe et al. . |
| 5,371,727 | 12/1994 | Shido et al. . |
| 5,372,930 | 12/1994 | Colton et al. . |
| 5,375,087 | 12/1994 | Moreland et al. .................. 250/306 X |
| 5,376,790 | 12/1994 | Linker et al. . |
| 5,381,101 | 1/1995 | Bloom et al. . |
| 5,382,795 | 1/1995 | Bayer et al. . |
| 5,383,354 | 1/1995 | Doris et al. . |
| 5,386,110 | 1/1995 | Toda . |
| 5,386,720 | 2/1995 | Toda et al. . |
| 5,388,323 | 2/1995 | Hopson et al. . |
| 5,388,452 | 2/1995 | Harp et al. . |
| 5,390,161 | 2/1995 | Kurihara et al. . |
| 5,391,871 | 2/1995 | Matsuda et al. . |
| 5,393,647 | 2/1995 | Neukermans et al. . |
| 5,394,741 | 3/1995 | Kajimura et al. . |
| 5,396,066 | 3/1995 | Ikeda et al. . |
| 5,396,453 | 3/1995 | Kawada et al. . |
| 5,397,896 | 3/1995 | Weiss et al. . |
| 5,400,647 | 3/1995 | Elings . |
| 5,406,832 | 4/1995 | Gamble et al. . |
| 5,406,833 | 4/1995 | Yamamoto . |
| 5,408,094 | 4/1995 | Kajimura . |
| 5,410,910 | 5/1995 | Somlyo et al. . |
| 5,414,260 | 5/1995 | Takimoto et al. . |
| 5,414,690 | 5/1995 | Shido et al. . |
| 5,416,327 | 5/1995 | Weiss et al. . |
| 5,416,331 | 5/1995 | Ichikawa et al. . |
| 5,418,363 | 5/1995 | Elings et al. . |
| 5,519,212 | 5/1996 | Elings et al. ........................ 250/306 X |

SCANNING PROBE TIP

52

SCANNING PROBE TIP

52

TREATED SURFACE

SCANNING PROBE TIP 52
32

GOLD PARTICLE
ATTACHED TO TREATED SURFACE

SCANNING PROBE TIP

BIOSPECIFIC MOLECULE ATTACHED TO GOLD PARTICLE

SPECIFIC BINDING SITE ON RECEPTOR, ANTIBODY, ETC

SCANNING PROBE TIP

BIOSPECIFIC MOLECULE RECOGNIZING SPECIFIC SITE ON RECEPTOR, ANTIBODY, ETC.

SCANNING PROBE TIP

BIOSPECIFIC MOLECULE ATTACHED DIRECTLY TO TIP

CURRENT RECORD

BINDING SITE

AMINO ACIDS

IMAGE　　　　　　　　TIP GEOMETRY

ATOMIC FORCE MICROSCOPE FOR BIOLOGICAL SPECIMENS

The present invention is concerned generally with atomic force microscope systems. More particularly, the invention is concerned with atomic force microscope subsystems, including an electrostatic microscope, an electroprobe microscope and an ultrasoft microscope probe and methods of use of these subsystems.

Biologic surfaces are the interfaces to the outside world. The cell surface with its specialized biomolecules including receptors, channels and pumps is where most regulatory hormones, drugs and other signals are directed, thereby making the biologic surface of particular interest to physiologists and pharmacologists. In order to shed light on these problems, it would be important to: (1) image and identify biomolecules at a molecular level in a physiologic environment; (2) visualize dynamically the structure-function relationships of biomolecules during physiologic, molecular biological, and pharmacologic perturbations; (3) physically manipulate biomolecules; and (4) electrophysiologically perturb, while imaging and/or measuring forces, voltage-sensitive tissues, and biomolecules. An instrument that could provide these capabilities would be invaluable in the study of the physiology and pharmacology of excitable tissues and biological molecules including those of the heart, vasculature, brain and nervous system, gastrointestinal system including the pancreas, and many other systems in living sciences.

By applying to an electrophysiologic instrument the principles of scanning probe microscopy (SPM), particularly atomic force microscopy (AFM) and scanning tunneling microscopy (STM), substantial insight in biological environments can be gained. Achievement of such discoveries has been frustrating because of the relatively poor resolution and/or the destructive nature of available modalities for imaging surface topology. For example, the electron microscope, although capable of high resolution, is limited because of the necessity of viewing the specimen in a nonphysiologic vacuum. The imaging of biological membranes and biomolecules, then, has been elusive. To date, emphasis has been on static structure, but physiologists and pharmacologists are more interested in the dynamic structure of a protein associated with ligand binding and dissociation under physiologic conditions. Efforts are being made to assess structure and function using crystallized proteins, but it is uncertain whether crystallized structure is the same as in the native membrane and whether normal physiologic function is preserved. Every technique has its strengths and limitations, and the strengths of AFM are that it can obtain structural information with high resolution at the protein surface where the ligand binding and dissociation occur. Further, the sample can be analyzed under controlled physiologic conditions.

In terms of pragmatic matters, sudden cardiac arthythmic death is a major public health problem accounting for perhaps 300,000 or more fatalities each year. Studies suggest that abnormal cardiac excitability is required to produce the proarrhythmic state responsible for malignant cardiac arrhythmias. Cardiac excitability is determined by the activities of biomolecules that are in, or span, the membrane including receptors, ion channels, gap junctions that mediate cell-cell communication, and pumps.

FM has been used primarily in industry to assess the uniformity of materials, the molecular structure of bulk organic materials and the characteristics of microchips. Compared to what is required for biological imaging, however, this is very low power resolution. The application to biology has been limited, and AFM in fact is not used very much in the biological research community. AFM has been used with varying success by some researchers to image statically: amino acid crystals (which are the building blocks of biological structures), proteins, genetic material (including DNA and RNA), organic monolayers and bilayers, whole cells, planar membranes and membrane bound proteins and lipid bilayers such as those that make up the membrane of the cell, as well as artificial membranes that are often used to reconstitute proteins of importance. Dynamic AFM imaging has been limited, but used enough to demonstrate the potential of AFM, particularly the imaging of fibrin polymerization, which is the process that occurs when blood clots, of the interaction of important chemical pathways in the body such as the phosphorylase-phosphorylase kinase system, and, as mentioned, the formation of antigen-antibody complexes.

There are also a number of limitations with AFM imaging, and two particularly important limitations include: (1) calibration of the tip and distortion due to the interaction between the tip and specimen; and (2) the unambiguous identification of imaged structures and recognition of binding sites. The AFM image results from an interaction between the tip and the specimen. A major criticism of AFM is the lack of calibration, which can detect distortion and estimate errors in measurement, that results from varying geometry and characteristics of the scanning tip.

One of the remaining substantial problems in using AFM for biological imaging in the living sciences is the need to unambiguously identify imaged structures and biomolecules and to locate with certainty the important biologically active subunits of such cells and biomolecules such as receptors and binding sites. Biomolecules are soft and easy to compress, often floating in a sea of lipids so that the cantilever tip may force the biomolecule down into the bilayer; in addition, the biomolecules are small. The distortion of images, the creation of artifactual images, and inaccuracies in measurement due to the shape of the scanning tip are relatively unimportant in the material sciences, but have posed major problems in imaging biomolecules. Biomolecules and the membranes in which they often exist are also fragile structures. The commonly used $Si_3N_4$ tip exerts a force of approximately 0.1 to 10 nN on the specimen; and an important concern has been whether this force causes structural damage. Therefore, a particular major limitation of the use of AFM in biological studies has been the stiffness of the imaging probe which, in turn has limited the resolution of the image. The probe also is known to compress biological specimens and likely produces mechanical injury to some of the biological specimens under study.

It is therefore an object of the invention to provide an improved atomic force microscope and method of use.

It is also an object of the invention to provide a novel passive probe having molecular level resolution of biological environments.

It is another object of the invention to provide a novel method and apparatus for high resolution detection of structural changes through imaging and/or force measurements when a cell is voltage- or current-clamped internally and as the cells are exposed to changing external fields or environments which alter transmembrane potentials or chemical and/or biochemical conditions in and out of the cell.

It is an additional object of the invention to provide an improved apparatus and method for mapping biological fields using an atomic force microscope with fuctionalized cantilever probes acting as sensors for biological environments.

It is still another object of the invention to provide a novel method and apparatus for mapping and identifying receptors and biomolecules of physiologic and pharmacologic importance with high spatial resolution.

It is yet a further object of the invention to provide an improved method and apparatus for high resolution imaging of biological media in solutions which improve resolution and allow study of dynamic physiologic and pathophysiologic conditions after structural or chemical perturbation.

It is still also an object of the invention to provide a novel method and apparatus for identifying physiologically and pharmacologically important biomolecules and their subunits on a cell surface using highly sensitive force measurements.

It is also an object of the invention to coat the cantilever tip with membrane reconstituted receptors, ion channel proteins, and other proteins for drug screening.

It is yet an additional object of the invention to provide an improved method and apparatus for controllably moving ligands, proteins, and other biological markers at the nanometer level to measure interactive forces.

It is also a further object of the invention to provide a novel atomic force microscope cantilever tip having a high degree of flexibility and selectable structure to control the cantilever tip degrees of freedom to respond.

It is another object of the invention to provide a novel group of chemicals for coating a cantilever tip of an atomic force microscope to control reactivity, charge state and density.

It is a further object of the invention to provide an improved method and apparatus for imaging biological receptor structures, while simultaneously recording the single- or multichannel conductance.

It is still an additional object of the invention to provide a novel method and apparatus for examining effects of cellular transmembrane potential on binding forces of materials on the cantilever tip of an AFM and on interaction forces between ligands, hormones, agonists and antagonists, and receptors.

It is also another object of the invention to construct the two legs of a cantilever tip with different spring constants to enhance the sensitivity of frictional force or lateral force imaging.

It is also another object of the invention to provide an improved method and bioprobe apparatus for delivering drugs to a specified molecule while monitoring interactions and resulting effects of delivery.

It is yet a further object of the invention to provide a novel method and apparatus for selectively coating an atomic force microscope cantilever tip with liquid coatings to form salt bridges, with amphipathic lipids to monitor surface hydrogen bonds, with hydrophobic materials to monitor surface hydrophobicity, and with photoactivated charges and electrical conductivity coatings for selected measurements.

It is still another object of the invention to provide an improved method for manufacturing atomic force microscope cantilever tips to any geometric shape or combinations of shapes.

These and other objects and advantages of the invention will become apparent from the following description including the drawings described hereinbelow.

BRIEF DESCRIPTION OF THE DRAWINGS

FIG. 9A shows an image of the lysozyme and FIG. 9B shows the adhesion forces measured between a naked tip (the dashed line) and the lysozymes and between a pG tip and the lysozymes (the open circles); the same naked tip was used for the preparation of the pG tip.

SUMMARY OF THE INVENTION

Figure 1A:
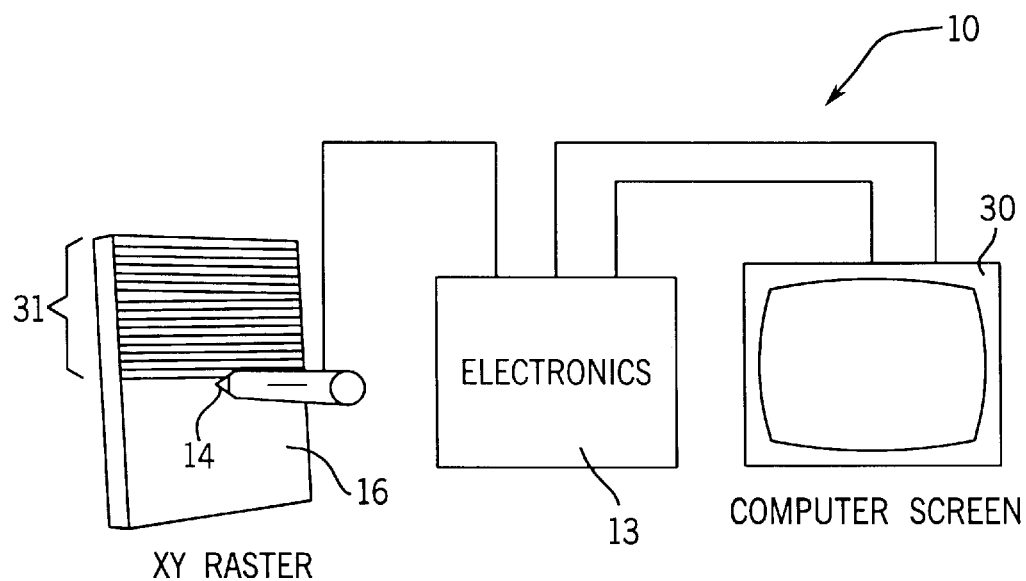
FIG. 1A illustrates an atomic force microscope constructed in accordance with one form of the invention.

The present invention includes an atomic force microscope for probing a biological specimen. Microscope components include (1) a cantilever arm having a tip attached thereto, with the tip including means for identifying biomolecules on the surface of the biological specimen, (2) means for providing a laser beam for reflecting off the cantilever tip, (3) means for scanning the tip relative to the biological specimen, and (4) means for detecting the reflective laser beam. Useful in conjunction with this invention are means for generating an electronic signal characteristic of the tip position, means operating on the signal, and means generating data as described more fully below. Alternatively and with reference to the following, the microscope of this invention can include various biomolecular identifiers for use in conjunction with the cantilever tip. In preferred embodiments, the means for identifying biomolecules and/or the biomolecular identifiers of this invention include a chemical entity for selective interaction with a biological site of interest on this specimen.

The chemical entity can include but is not limited to an antibody, a ligand, and a protein. Alternatively, the chemical entity includes an amphipathic molecule coupled to the cantilever tip. Such amphipathic molecules can be selected from but are not limited to the small lipid molecules, detergents, and large macromolecules. Alternatively, such amphipathic molecules can be various charged molecules and/or zwitterions.

Likewise, the microscope of this invention can include means for identifying biomolecules and/or biomolecular identifiers of the type disclosed herein, which have, without limitation one or more of the following: receptor molecules coated onto the cantilever tip, a zwitterion liquid coating, amphipathic liquids with protein donors, amphipathic liquids with protein acceptors, and hydrophobic molecules.

Without limiting the scope of this invention, other embodiments include atomic force microscopes with cantilever tips coated with photoactivated charges, conductive materials, or semiconductive materials.

In part, the present invention can also be described as a cantilever tip suitable for use in a probe for sensing biological surface structure. The tip includes at least one leg portion and either one or both of a whole or a cutout in the leg portion. In various preferred embodiments of the invention, the tip has a leg portion which includes a plurality of holes. In various highly preferred embodiments, the tip can include at least two leg portions and, alternatively, leg portions with different hole patterns. Notwithstanding any one particular tip configuration, the probe suitable for use therewith can include but is not limited to an attractive force imaging probe, an adhesion force imaging probe, and a mechanical repulsive force imaging probe.

In part, the present invention also includes an atomic force microscope for electrical probing of a biological specimen. Such a microscope includes (1) a cantilever arm having a tip attached thereto, (2) means for coupling electrodes to a biological specimen and means coupled thereto for applying selected electrical fields and sensing electrical outputs responsive to, (3) means for providing a laser beam for reflecting off the cantilever tip, (4) means for scanning the tip relative to the biological specimen, and (5) means for detecting the reflected laser beam. In various preferred embodiments, the tip includes a pharmaceutical coating and, alternatively, a pharmaceutical coating combined with a biological site on the biological specimen.

Figure 1B:
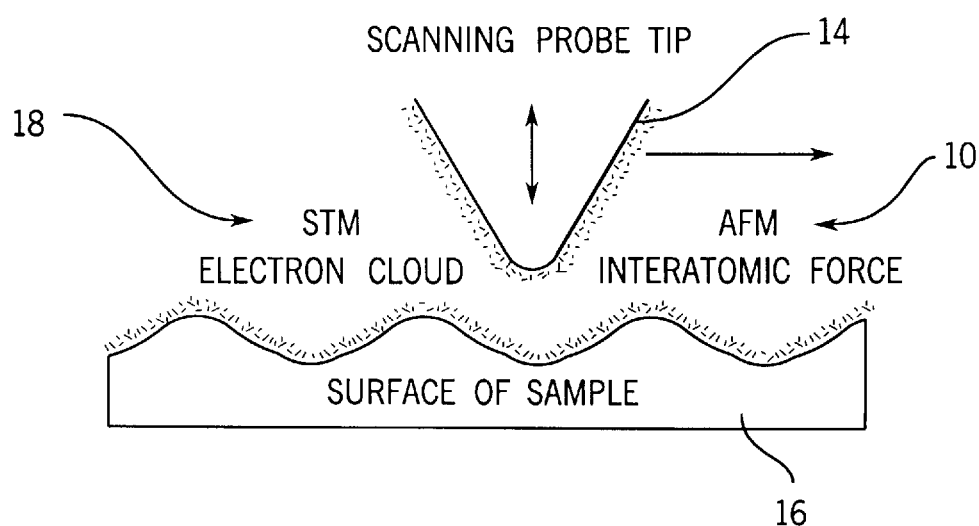
FIG. 1B illustrates scanning microscope and AFM operating modes using a scanning probe tip.

An improved atomic force microscope (AFM) constructed in accordance with the invention is indicated generally at 10 in FIGS. 1A and 1B. The AFM 10 passively senses interatomic force through a cantilever 12 (see FIG. 2A) or arm that has a very sharp imaging tip. Conceptually, this can be thought of as an atomically sharp phonograph needle (tip 14) that tracks across the surface of a material 16. The tip 14 detects the contours and bumps in the grooves of the "phonograph," and the motion of the needle (or the tip 14) and the phonograph arm (the cantilever 12) is translated into an electrical signal that is converted to sound.

Figure 2A:
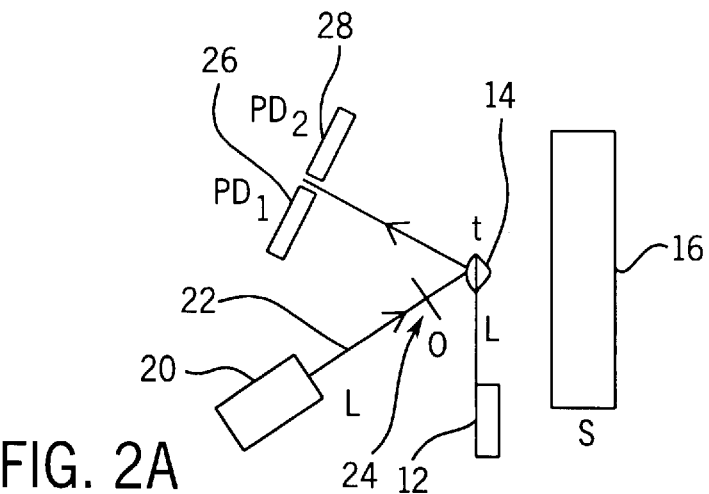
FIG. 2A illustrates a cantilever tip, laser and detector part of an atomic force microscope
Figure 2B:
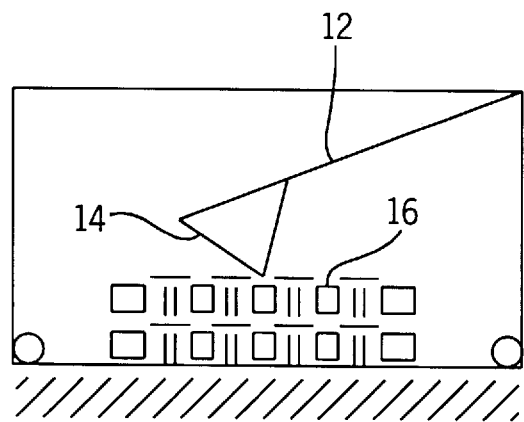
FIG. 2B illustrates a schematic of a fluid cell which allows imaging in a physiologic environment.

As shown in FIG. 1B in the case of the AFM 10, the scanning probe tip 14 of the AFM 10 is only a few atoms in size, so the forces that surround these atoms interact with the forces in a material or specimen 16 that surround the atom or conglomeration of atoms in molecules of the specimen 16 under study (primarily repulsive forces in the AFM 10 as shown on the right, but it can be the forces of the electron cloud that surrounds the atoms as with another form of this passive force microscope, the scanning tunneling microscope 18 (STM) on the left). As the tip 14 scans the surface of the sample (FIG. 1; S in FIG. 2A), the interatomic forces deflect the tip 14 and hence the cantilever 12. The cantilever 12 (see FIG. 2A) to which the scanning probe tip is attached is the force sensor. The cantilever spring has a spring constant that is lower than the effective spring between two atoms. The deflection is measured by a laser optical deflection detection system, and FIG. 2A shows a laser source 20, a laser beam 22 passing through an optical system 24 that is reflected off the cantilever 12 onto two photodetectors 26 and 28. The reflected laser beam 22 falls asymmetrically at the two photodetectors 26 and 28. A piezo tube on which the specimen resides moves the sample in the x, y, and z dimensions and is also used in a feedback loop to keep the deflection and (hence the tracking force) constant while the tip 14 scans the specimen 16. The specimen 16 is scanned in the X- and Y-planes with this cantilever 12, the deflection in the Z-plane is measured, the signals converted by electronics 13 to a signal for display, and the resulting three-dimensional contours are displayed on a computer screen 30. FIG. 1 shows x,y raster 31 and the cantilever tip 14 moving towards and away from the surface as well as a three dimensional picture on the computer screen 30. FIG. 2B is a schematic of a fluid cell 32 that allows imaging in a physiologic environment which, as will be discussed, is one of the unique advantages of the AFM 10. The fluid cell 32 is sealed by use of an "O" ring seal, and both the cantilever tip 14 and the specimen 16 (in this case, labeled "gap junctions") are immersed in a fluid that can be changed through inlet and outlet ports.

Bioprobe

In a preferred form of the AFM 10, a specifically functionalized cantilever tip (a bioprobe tip 52 as shown in FIG. 3) allows the identification of physiologically and pharmacologically important biomolecules and their constituent subunits. This preferred form of the AFM 10 can be used on pure preparations, on preparations reconstituted in artificial membranes and on the cell surface of living cells. In essence, the bioprobe tip 52 can be biospecifically functionalized and will interact specifically with a molecule or site on the molecule while force is being measured and an image obtained.

An antibody, ligand or other protein or chemical that is capable of interacting specifically to a biomolecule or site on a biomolecular of interest is attached to the bioprobe tip 52). For example amphipathic molecules, such as small lipid molecules, detergents or large macromolecules (including polymers or proteins), can be used to coat the tip 14. These molecules can be charged or zwitterions. The tips 14 can be coated in the manner set forth in Example I and II. By mixing different compositions of ampipathic molecules, one can control the charge density on the tip 14 using molecules with different PKAs of the acidic or basic group. A negatively charged tip 14 can be converted readily to a positively charged tip 14 by changing the solution pH (which changes the polarity and charge). Coating materials can readily be removed by washing the tip 14 and the test chamber with organic solvents, such as chloroform or ethanol. This enables reuse of the tips 14 without recalibration.

When the bioprobe tip 52 comes in contact with the molecule or subunit of the molecule to which the tip 52 has been specifically functionalized, a strong force would be needed to separate them (rupture force) due to the interaction, and the increased force of the interaction can be measured using the AFM 10. The force of interaction between the bioprobe tip 52 and the sample 16 is measured while scanning with the AFM 10 to obtain both force and morphological information.

We have found that "force dissection" can be used to suggest the type of adhesion forces present. We not only can measure the force of attraction, but we can also measure the force required to separate the bioprobe tip 52 from the specimen 16 which estimates the force of the binding between molecular pairs.

Referring to FIGS. 3A–F, the bioprobe tip 52 begins as an untreated scanning probe tip (A) which is then treated to alter the charge (B), a chemical compound, e.g., a lipid, is attached to the treated surface (C), a biospecific molecule 34 is attached to chemical 32 or, alternatively, can be attached directly to the treated scanning probe tip 52, and the biospecific molecule 34 acts as a biospecific probe, binding, for example, a receptor 38.

Figure 3A:
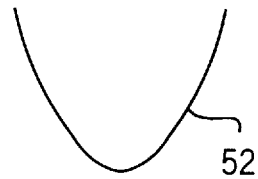
FIG. 3A shows an untreated AFM scanning probe tip.

In FIG. 3A, the scanning bioprobe tip 52 of the cantilever 12 is the component that is functionalized to become biospecific. We have been using as a base tip a standard commercial microfabricated V-shaped $Si_3N_4$ cantilever with an integrated tip (of $Si_3N_4$). The choice of this tip 14 was its availability and its compatibility with standard atomic force microscopes. A number of other materials can be used so long as their surface charge can be changed, and some other materials may be suitable with minimal or no surface modification.

Figure 3B:
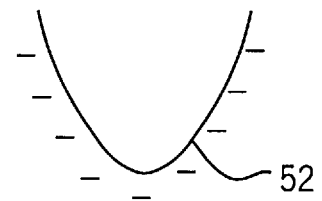
FIG. 3B shows a treated tip allowing binding to other molecules.

In FIG. 3B, the surface of the tip 14 is treated so that it can bind other molecules 32. We have used several strategies to alter the surface of the cantilever tip 14 by modifying the charge (positive or negative charge as shown) or the stickiness of the surface, and other approaches.

Figure 3C:
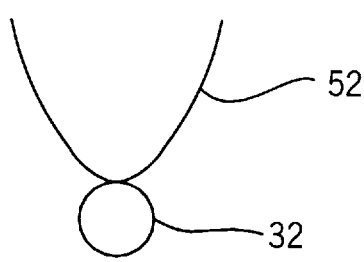
FIG. 3C shows a tip fuctionalized by attaching a particular material to the tip.

In FIG. 3C, the surface of the tip 14 that has been treated can be fuctionalized either directly (see F below where the biospecific molecule 34 is attached to the tip 14) or through an intermediate structure that is attached to the tip.

Figure 3D:
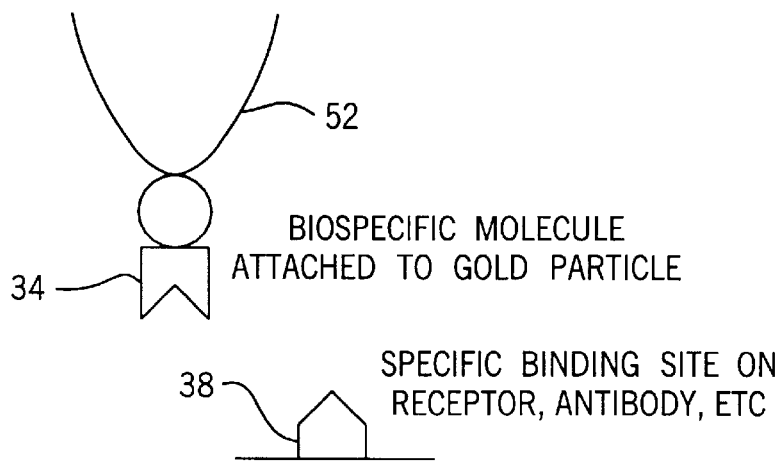
FIG. 3D shows a biospecific molecule attached to the tip and near a specific binding site.

In FIG. 3D, the biospecific molecule 34, for example a protein that can interact only with a specific receptor, is attached to chemical 32 (shown) or directly to the scanning probe tip (not shown). The biospecific molecule 34 is shown approaching the receptor 38 which, in turn, is in the membrane of a cell.

Figure 3E:
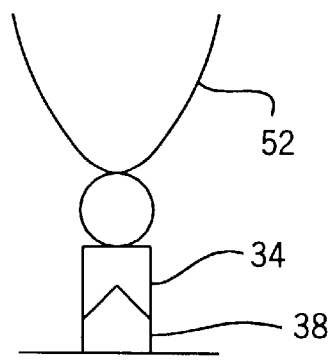
FIG. 3E shows a biospecific molecule on a tip joined to a specific site.

In FIG. 3E, the biospecific molecule 34 recognizes the specific receptor 38 (or other specific site such as an antigen, antibody, etc.) in this case in cavities on the probe molecule that contain anionic groups that react with the cationic groups of the receptor 38, a possible H binding site, or other mechanisms of binding. There will be a strong force of attraction due to the binding of the ligand probe (the biospecific molecule 34) and the receptor 38 and the increased force of the interaction can be measured using the AFM 10.

Figure 3F:
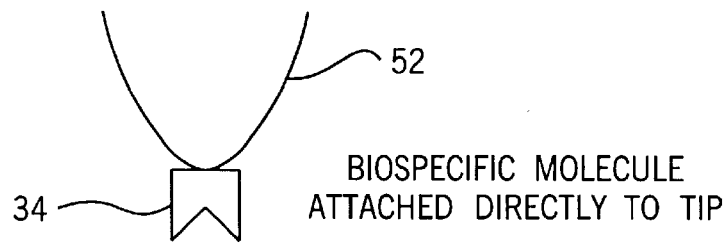
FIG. 3F shows a biospecific molecule attached directly to the tip.

In FIG. 3F, the surface of the tip 14 that has been treated often can be functionalized either directly by attaching the biospecific molecule 34 directly to the tip 14 itself as shown in this figure. The fuctionalized tip 14 would react with the receptor 38 or other specific site on the receptor 38 or other protein as in FIG. 3E.

This phenomenon of interaction can include, for example, use of a monolayer or multilayer of lipids coated onto the tip 14 (see FIG. 9C) for studies of membrane lipid structure and chemical or physical properties or electrophysical properties of membranes. Biomolecules which bind periplasmically or anchor into the molecules can be coated onto the tip 14 for study of chemical and biochemical properties. Receptors 38 can be coated onto the tip 14 to screen its interaction with different drug molecules coupled to the specimen 16, or between a membrane and a cell or virus, or DNA protein.

In another aspect of this invention the tip 14 (and even the cantilever 12) can be coated photoactivated charges with activation accomplished using the laser beam 22 (see FIG. 2A). A conductive line can even be disposed on the cantilever 12 by activating part of the photoactivated charges, washing off the unactivated part by conventional photolithography techniques, including deposition of a secondary coating as needed to complete a narrow conductive line on the cantilever 12.

For the reasons discussed above, the bioprobe tip 52, coupled with the AFM 10, offers the highest resolution available for physiologic biological imaging, and can be done in physiologic solutions (with minimal or no cellular damage).

Electroprobe Microscope (EPM)

Figure 4A:
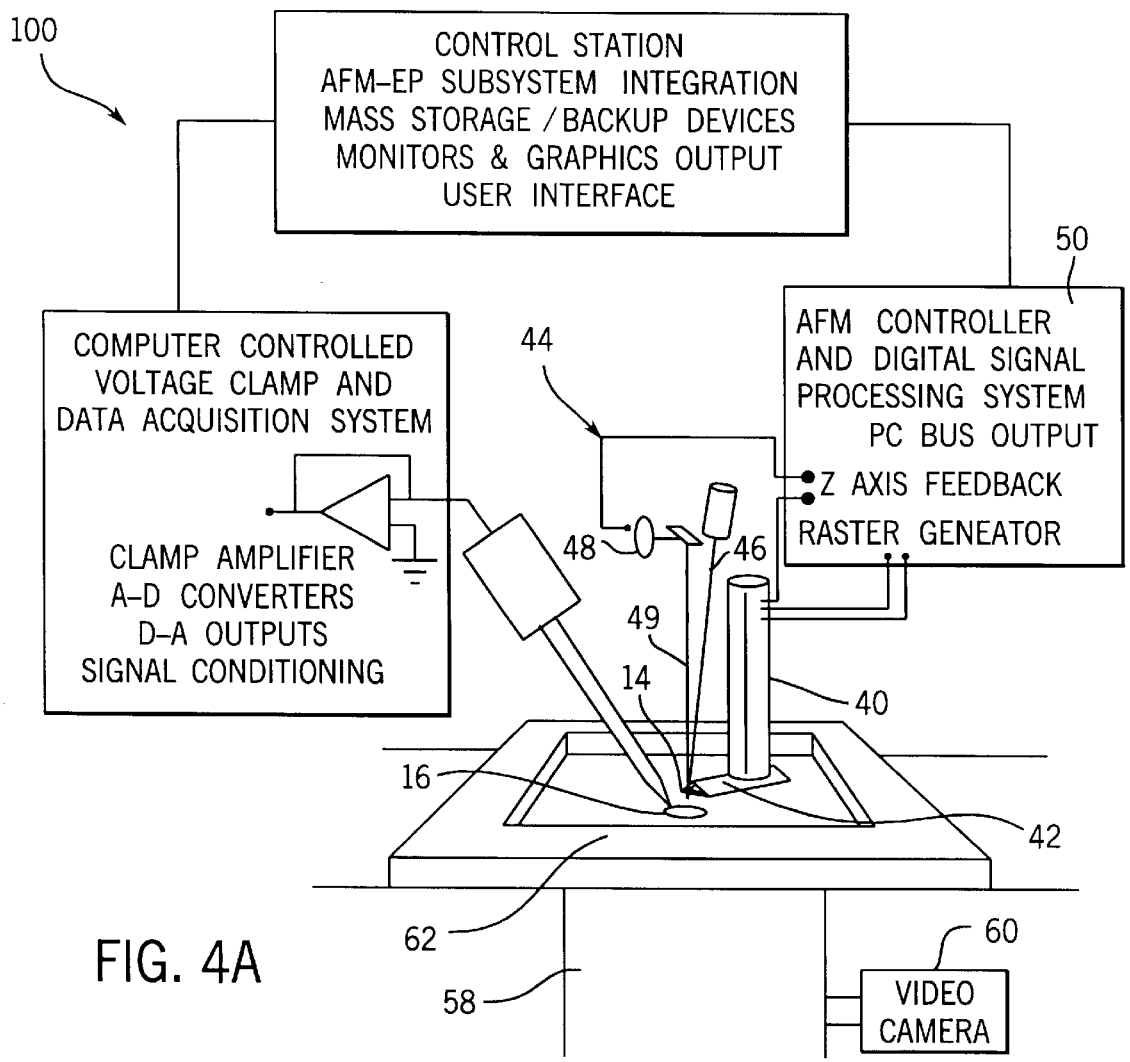
FIG. 4A shows an AFM modified to perform electroprobe functionalities in accordance with the invention.
Figure 4B:
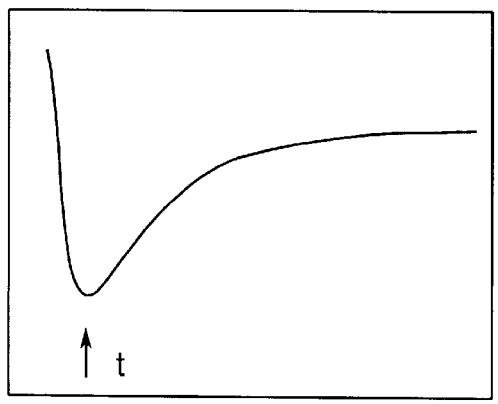
FIG. 4B shows a current flow record for a scan by the modified AFM.
Figure 4C:
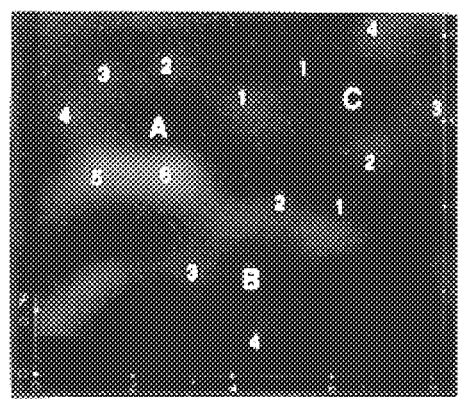
FIG. 4C shows an AFM image illustrating cell channels for the point "t" on FIG. 4B.

In another preferred form of the AFM 10, electrophysiologic perturbations can be applied to biological materials and studied. FIG. 4A illustrates an electroprobe microscope (EPM) 100 constructed in accordance with the invention. The EPM 100 includes most of the components of the AFM 10 of FIG. 1 which has been described above. The components of the EPM 100 in FIG. 4A include a piezoelectric XY scanning arm 40 to which is attached the cantilever 42 that can be lowered and positioned utilizing a commercially available controller. A laser optical system 44 is used in which a laser beam 46 reflects off the cantilever 42 to photodetector 48. A deflection of the cantilever 42 causes the reflected laser beam 49 to fall asymmetrically onto the photodetector 48. The difference signal from the photodiodes are operated on by electronics 50; and the output is used, most commonly, as a feedback loop to keep the deflection and hence the tracking force constant while the tip 14 scans the specimen 16. The piezoelectric arm 40 rasters the specimen 16 in the X- and Y-planes, and the Z-plane is superimposed resulting in a three-dimensional scanner on the CRT or other display device (not shown). The EPM 100 can therefore function to generate a current flow record for a scan (FIG. 4B) with an AFM image in FIG. 4C generated for cell channels for the point "t" in FIG. 4B.

Figure 4D:
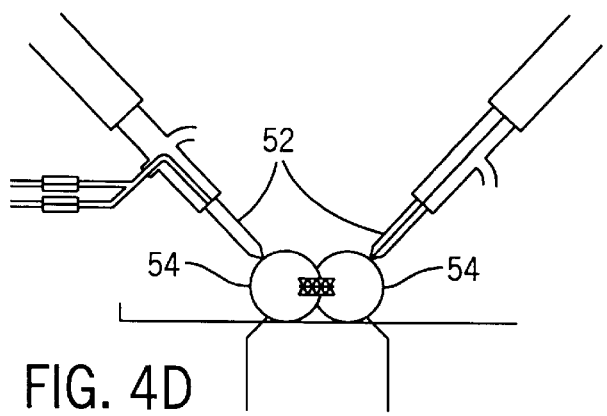
FIG. 4D shows two patch clamp electrodes of the AFM positioned on the surface of two cardiac myocytes.
Figure 4E:
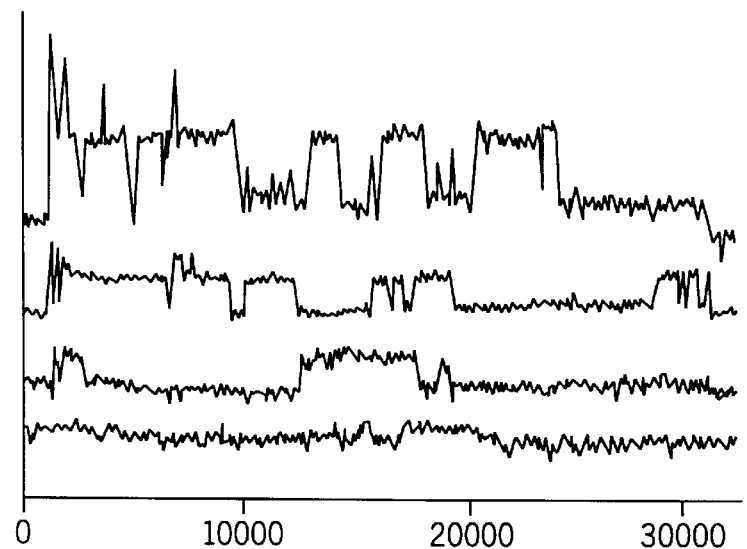
FIG. 4E shows recorded data of the voltage dependent decay of junctional currents from the electrodes of FIG. 4D
Figure 4F:
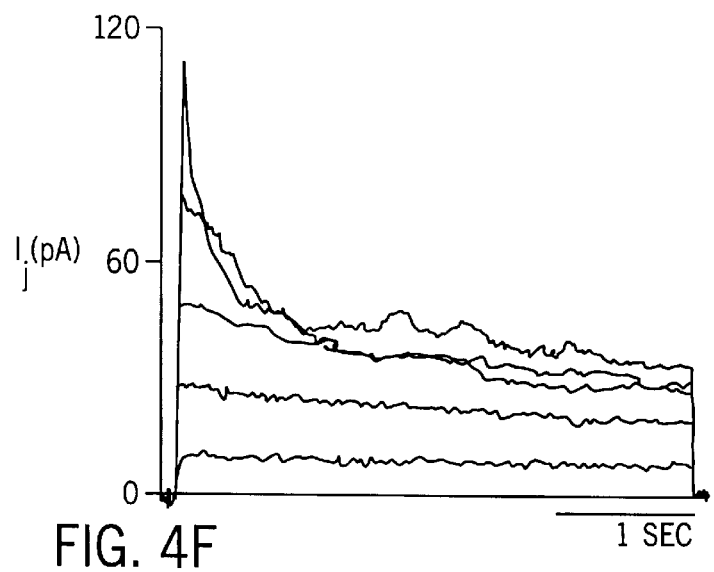
FIG. 4F shows selected current tracings with single channel activity of the gap junction for different junctional voltages.

FIG. 4D shows two patch clamp electrodes 52 that have been positioned on the surface of two cardiac myocytes 54. Suction was applied through a port (not shown) to form a gigaseal and rupture the cell membrane thereby allowing voltage control. The two headstages allow collection of the electronic signal and current can be fed back through these electrodes 52 to accomplish current- or voltage-clamping. Both cells (the myocytes 54) can be individually voltage-clamped. The microelectrode arrangement enables control and test solutions to be injected into the micropipette and thereby into the cell manually, electrophoretically or with a stepper motor. FIG. 4E shows recordings of the voltage-dependent decay of junctional currents ($i_j$) from a study in adult rat atrial cells. FIG. 4F shows selected tracings of currents with single-channel activity of the gap junction for different junctional voltages. Single myocytes and multicellular cardiac tissues as well as neurological preparations can be studied with the EPM 100. Complicated multistep voltage-clamp protocols can be programmed into the computer. With reconstituted membranes and excised patches, a potential difference can be created across the membrane using this arrangement. The effect of transmembrane potential on binding force of materials coated on the tip 14 can be monitored. This will help understand how the membrane potential affects adhesion force of water soluble molecules onto cell surfaces. Further, the EPM 100 enables imaging receptor structure and recording single and multiple channel conductance simultaneously. Voltage regulated in channels can be activated while imaging their structural changes in both open and closed states on the cell surface in physiological solutions.

In the EPM 100 of FIG. 4A, we include capabilities of current- and voltage-clamping of single cells, patches, and artificial membranes. The voltage-clamping capabilities include patch clamping as well as single and multiple microelectrode techniques. The positioning of the electrode (s) 52 necessary for voltage perturbation, control and measurement is also shown in FIG. 4A. Access to the specimen 16 is required for both the probe and the electrodes 52 (or field electrodes in the case of reconstituted membranes). As seen in FIG. 4A, the design utilizes an inverted microscope 58 that allows the preparation to be visualized optically and by video camera 60 from below through a transparent tissue bath 62. This cellular electrophysiologic arrangement also allows the use of specialized light sources when voltage-sensitive and other dyes are used. The temperature of the tissue bath 62 can be controlled either by radiant heat since continuous superfusion will be disruptive to the imaging. The solutions can be changed by utilizing input and output ports. The design of the tissue bath 62 shown (F) is for whole cell (or two-cell) voltage-clamping. A small modification utilizing a support can be substituted for the tissue bath 62, and we have an insert that orients the reconstituted membrane as desired. The solution within the micropipette can be modified using standard techniques. We can even introduce antibodies and drugs into the tips 14 as part of an experimental protocol in which voltage is applied and electrical response characterized.

The probe being used as a sensor is important to the EPM 100. Study of the functionalized cantilevers 42 was started by analyzing force-distance curves generated by imaging a variety of substrates and samples with a commercially available microfabricated "V"-shaped 100–200 micron $Si_3N_4$ cantilever with an integrated tip (of $Si_3N_4$) (Digital Instruments, Santa Barbara, Calif.). A variety of attractive, repulsive forces and adhesive forces act on the cantilever tip 14. In normal contact mode imaging, interatomic repulsive forces (due to overlapping electron clouds) predominate and are responsible for images. Long range attractive forces include coulombic and van der Waals forces. Adhesion forces include short range coulombic, hydrophobic, van der Waals, capillary and hydrogen bonding forces. These cantilever probes that have been functionalized to recognize specific proteins such as a channel or subunits of the protein will be most useful in guiding the imaging cantilever 42. The AFM circuitry allows nanometer positioning control.

Software useful in conjunction with the invention and, in particular, for operating the EPM 100 will be available to a programmer of reasonable skill and made aware of the invention, through straight-forward modification of existing commercial software capable of image analysis. Without limiting the invention in any manner, any such program can be guided by one or more of the following considerations: Integration of controller and electrophysiologic data; timing of electrophysiologic events with imaging so as to allow the proper structure-activity correlations; accurate positioning and restriction on the number of scans so as to increase the temporal resolution to 5 msec or less which is required for most voltage-sensitive biomolecules (one dimensional scanning will require image direction, similar to the use of two-dimensional echocardiography that will allow the selection of a single line for analysis; a series of single dimensional images could be reintegrated into an image); and superimposition of images with force measurements.

Figure 15:
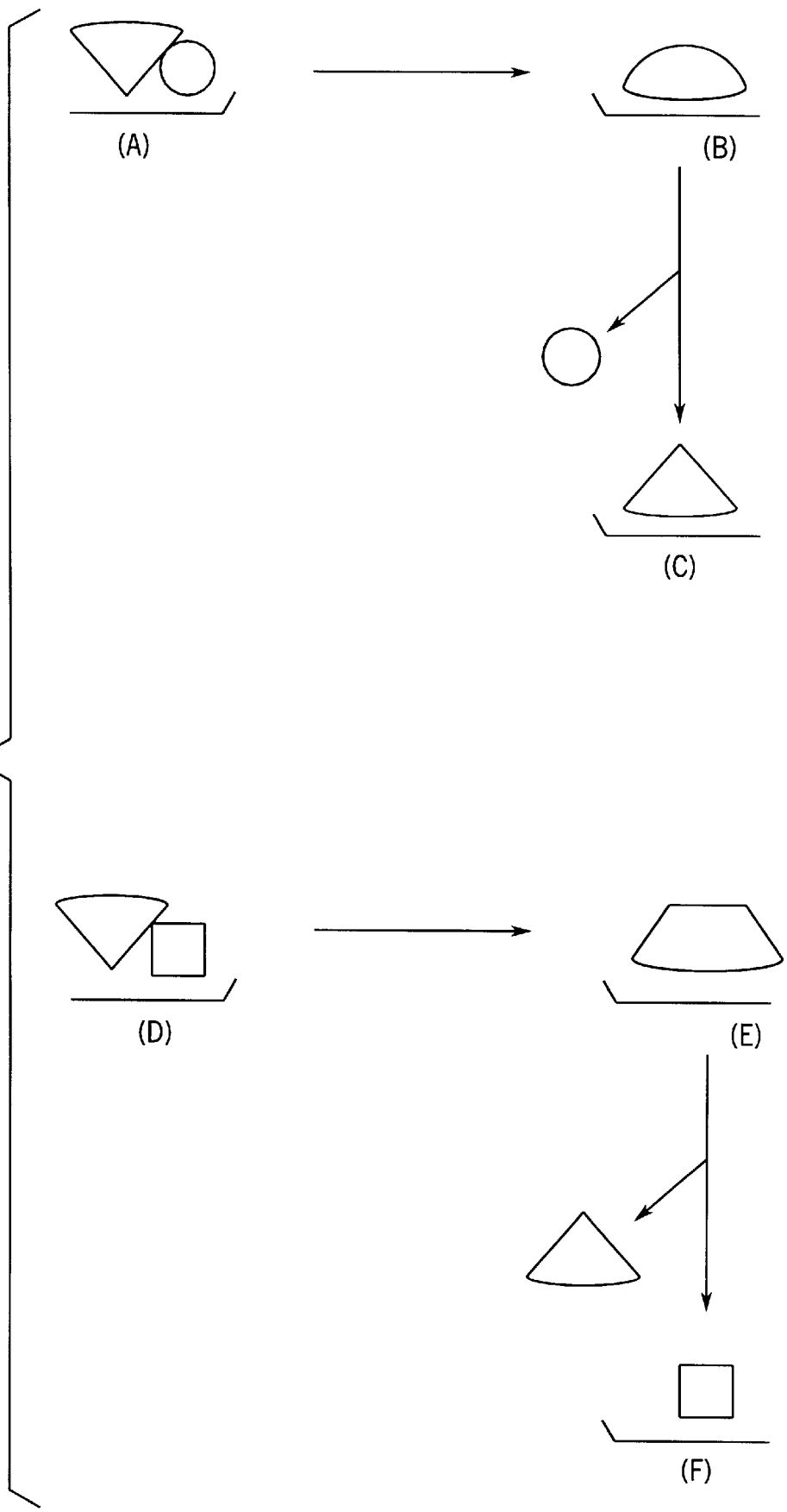
FIG. 15 is a schematic illustration of the tip geometry deterioration and SFM image calibration, in accordance with the present invention and for use in conjunction therewith.

Irrespective of the particular software, programming, signal generation and/or data acquisition systems utilized, it is contemplated that the tip will be calibrated to account for and reconcile tip geometry and its interaction with the specimen structure. A protocol of the type required for correction of the tip effect, from SFM images, will include two steps: (1) calculation of the true tip structure as illustrated schematically in FIG. 15 (steps A–C); and (2) deduction of the specimen structure from the SFM image which is a tip-sample convolution product, as illustrated in FIG. 15 (steps D–F). The scanning of the tip over the spherical colloidal gold particles will generate a picture of (B), which will be a convolution product of both the tip and the gold particle. Elimination of the volume of the gold particle will yield the structure of the portion of the tip interacting with the gold particle. The gold particle is assumed to be an ideal spherical. The highest point of the image of the gold particle is assigned to be the diameter of the gold particle and to be the tallest point of the particle. The resulting tip is in an upside down orientation which is expected from the path of the tip or the S-line. Assuming (E) is the image of a specimen obtained using the same tip calibrated with gold particle, the true size and shape of the specimen can then be calculated as shown in (F).

Figure 16A:
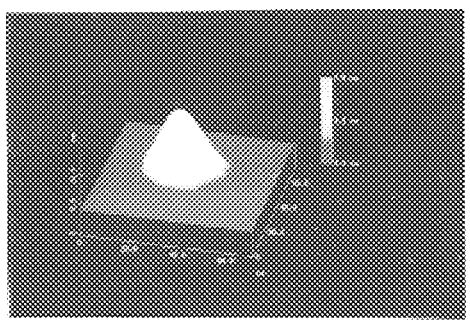
FIG. 16A is a three-dimensional plot of a tip structure from a representative analysis of gold particles.
Figure 16A:
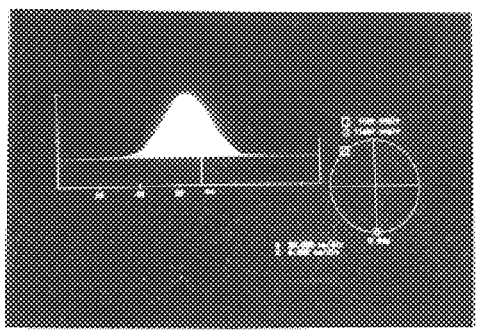
Figure 16B:
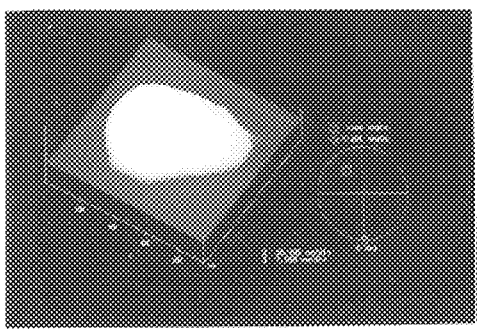
FIG. 16B is a comparison plot.
Figure 16B:
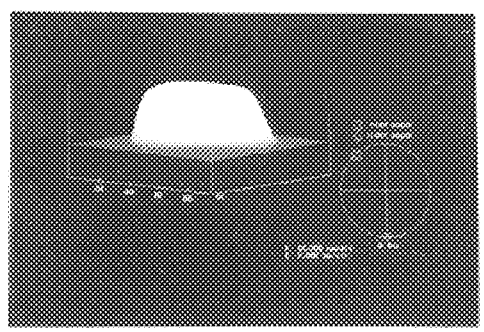

For gold particles with a size of 40 nm or less, the tip structure dominates the image. For purposes of illustrating this aspect of the type or kind of programming which could be used, FIG. 16A is a three-dimensional plot of an image of a 20 nm gold particle and the tip structure from the analysis of the image with software representative of the type which can be used with this invention and, particularly, for tip reconstruction. The irregular pattern of the images of the spherical gold particles observed are a result of the unpredictable shape of the tip. For purposes of comparison, FIG. 16B is a three-dimensional plot of an image of 20 nm gold particle imaged with a bad tip and the tip geometry reconstructed from the image of the same 20 nm gold particles.

AFM technology permits high resolution imaging of living cells in a physiologic environment. The modification that will allow the electrophysiologic control of voltage-sensitive biomolecules will allow the study of structure-activity and structure-function of biomolecules that are central to the control of the brain, nervous system, heart, the pancreas, the gut and other structures in health and disease. The EPM 100 will delineate how pharmaceutical agents act. The use of fuctionalized biospecific cantilevers allows the precise identification of voltage-sensitive structures.

The advantages of the EPM 100 are therefore that it can obtain quantitative structural information with high resolution at the membrane protein surface where the ligand binding and dissociation occur, the sample 16 can be analyzed under physiologic conditions, and, the fuctionalized biospecific cantilever tips 14 will allow the measurement of interaction forces and, thereby, the unambiguous identification of molecules and subunits of molecules as well as the binding sites of specific ligand and drug molecules. The EPM 100 can be used to study many important voltage-sensitive biomolecules.

The precise positional control of the EPM 100 is an important advantage so that the probe can be brought to an individual molecule. Moreover, the force of the cantilever 12 against the specimen 16 can be used to "dissect" molecules or structures, as, for example, in our studies on gap junctions in which "force dissection" revealed normally inaccessible surfaces, specifically, the docking areas of the gap junctions that allow cell to cell communication (see FIGS. 10–12).

Electrostatic Force Microscope (EFM)

Figure 5:
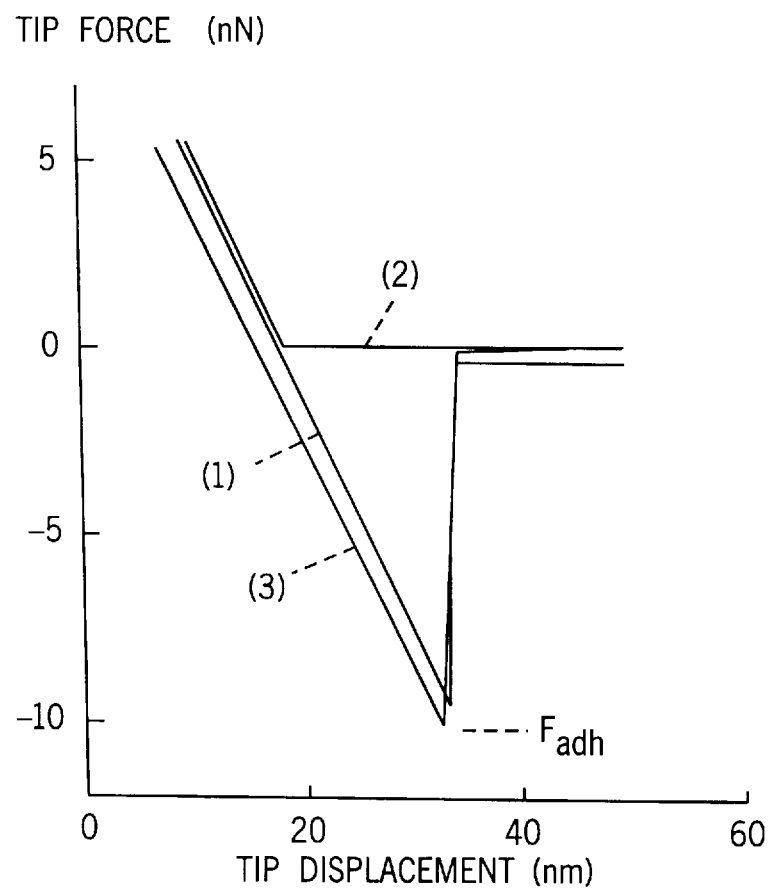
FIG. 5 illustrates hydrophobic force between an untreated $Si_3N_4$ tip and a paraffin surface with (1) being measured in water in the presence of 5M NaCl (5M NaCl, 2 mM $CaCl_2$, 1 mM EDTA), (2) in water in the presence of ethanol and (3) in water in the absence of the 5M NaCl of (1)

Untreated $Si_3N_4$ tips ("naked tips"), were used as a reference. These reference tips 14 were then treated so as to render them positively or negatively charged and also to image substrates that were positively charged, negatively charged or nonpolar. Moreover, imaging could be performed in air or, using a fluid cell, in a variety of solutions. Hypotheses based on current theory were tested by analyzing force-distance curves which provides insight into the interaction between tip and specimen. FIG. 5 illustrates a force (y-axis) vs. distance (x-axis) curve generated by the EFM, which hereafter for simplicity will be called a "force curve."

The standard $Si_3N_4$ tip had a hydrophobic surface as evidenced by a force curve determined from the image of a paraffin surface. A high adhesion force (9.6 nN) was measured when a naked $Si_3N_4$ tip imaged the paraffin surface (dielectric constant of 2.2) in water (trace 1, FIG. 5). The force became negligible when the imaging was performed in ethanol (0.2 nN, trace 2 in FIG. 5) and only slightly decreased when performed in 5M NaCl solution (9.8 nN, trace 3 in FIG. 5). In comparison, when a mica surface was imaged with an untreated or "naked" $Si_3N_4$ tip, a five- to ten-fold reduction of the adhesion force was observed when imaged in 5M NaCl instead of water. The coulombic and the van der Waals forces seemed to play a significant role on the adhesion force between the naked tip and the paraffin surface since the addition of 5M NaCl, which would change the dielectric constant of the media, had little effect on the adhesion force. Both coulombic and van der Waals force are inversely related to the dielectric constant of the solution.

Figure 6A:
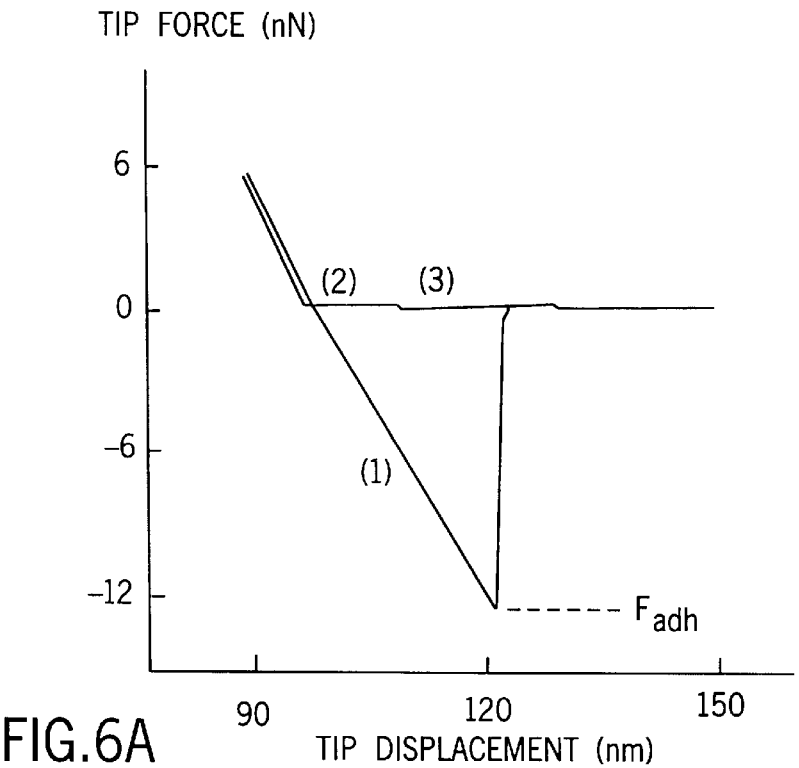
FIGS. 6A and B illustrate various adhesion forces between a negatively charged pG tip and a positively charged surface with FIG. 6A imaging DEAE-Sephadex beads and (1) being the DEAE-Sephadex placed on a mica surface and imaging with electrostatic force microscopy using the pG tip and adhesion force marked $F'_{adh}$, (2) being the same tip as (1) imaging mica under water or (3) same tip being coated with pG used to image DEAE-Sephadex beads and FIG. 6B imaging APTES-glass in water with (1) being the adhesion force between the pG tip and the APTES-glass, $F_{adh}$; (2) being APTES-glass imaged after the lipids had been washed away from both the tip and a fluid cell and (3) being APTES-glass imaged with the same tip before being coated with pG, $F_{a'h}$.

One of the tips 14 coated with pG acted as a negatively charged sensor. The adhesion forces between the negatively charged pG tip 14 (net negative charge per pG molecule is 1) and the cationic DEAE-Sephadex beads was 12.7 nN (trace 1, FIG. 6A), much higher than the 0.1 nN observed for a naked tip on the beads or the pG tip on mica (traces 2 and 3, FIG. 6A). $Ca^{++}$ (up to 4 mM) increased the adhesion force by one- to five-fold for both the naked tip 14 and the pG tip 14 imaging mica.

Figure 6B:
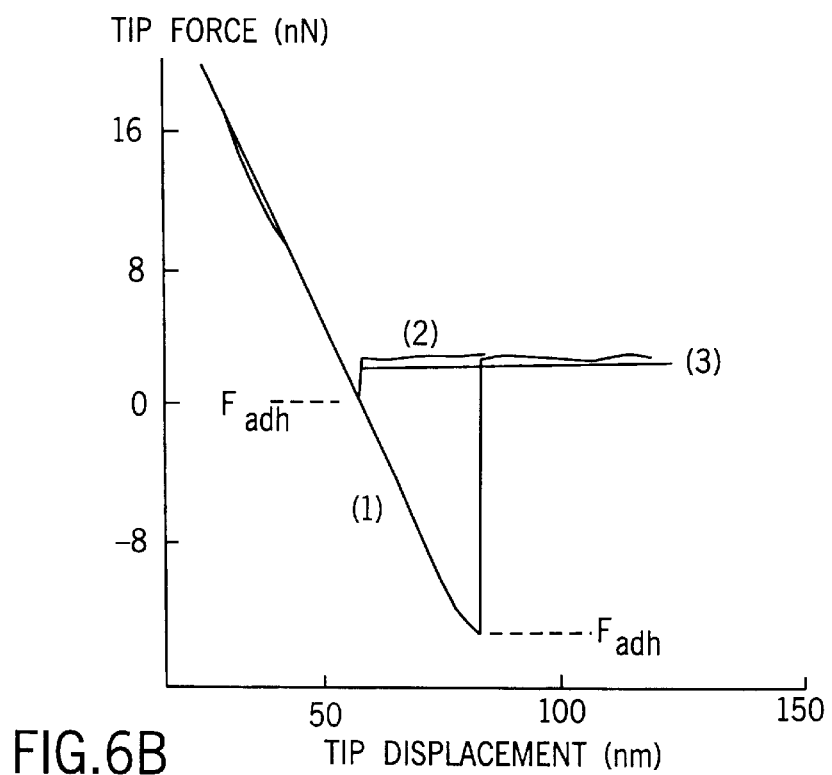

Imaging APTES-treated glass showed a higher adhesion force with the negatively-charged pG tip 14 (16.2 nN, trace 1, FIG. 6B) as compared to the naked tip 14 (2.5 nN, trace 2) or the pG tip 14 after lipids had been washed away (2.1 nN, trace 3). The measurements with a naked or organic solvent-cleaned tip 14 were essentially the same.

Figure 7A:
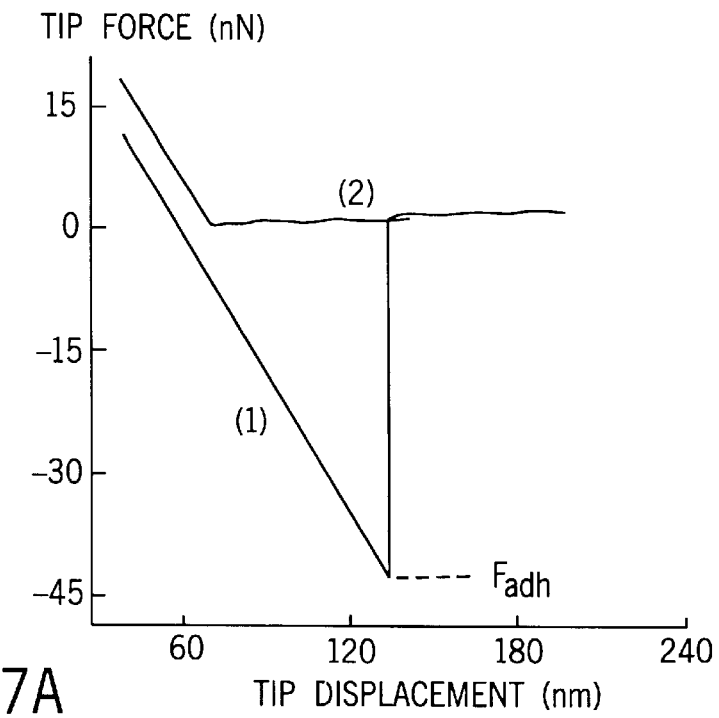
FIGS. 7A and B show adhesion and attractive forces between a positively charged DOSPA tip and mica with FIG. 7A illustrating adhesion force for mica imaged under water with (1) being a DOSPA tip and (2) being a bare tip and FIG. 7B illustrating attractive force with an extending force curve shown and (1) being a DOSPA tip on mica in water; and (2) being a naked tip on mica in water.
Figure 7B:
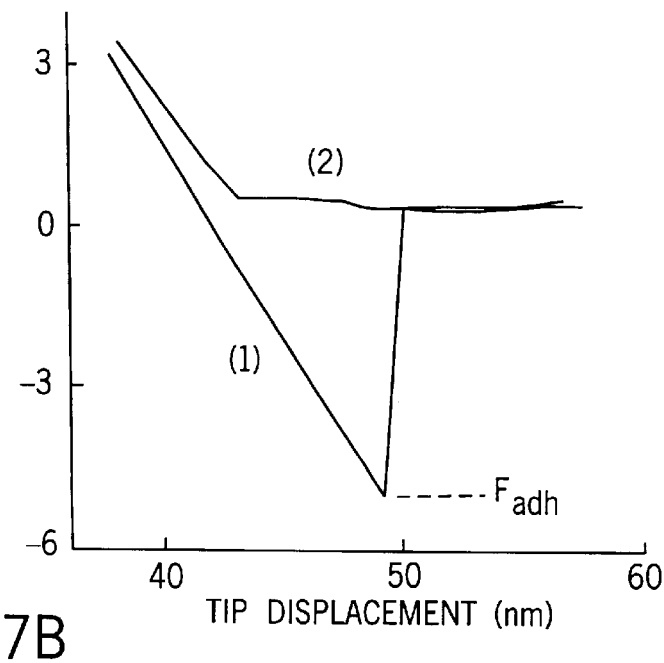

A cationic DOSPA tip 14 (five net positive charges per lipid molecule) yielded high attractive and adhesion forces on negatively charged mica (5.4 and 44.5 nN) for the attractive and adhesion forces, respectively, traces 1 in FIGS. 7A and 7B, as compared to a bare tip (0 and 0.5 nN for the attractive and adhesion forces, traces 2 in FIGS. 7A and B). Both the sizes of the attractive and the adhesion forces were lipid concentration dependent. A five- to eight-fold reduction of the adhesion force was observed for different lipid tips 14 when imaged in 5M NaCl solution (5M NaCl, 2 mM $CaCl_2$, 1 mM EDTA) as compared to imaging in water.

Three different tips 14 were analyzed for their geometry before being used for the force study (Table 1), and the adhesion forces for the naked tips 14 on paraffin and mica and the DOSPA tips 14 on mica varies. The first and second tip 14 with similar $R_T$ seem to have similar adhesion forces on paraffin (without tip coating) and mica (with DOSPA coating), whereas the third tip 14 with larger $R_T$ showed higher adhesion force on paraffin and mica.

TABLE 1

Tip parameters and forces for four tips under various circumstances

| | Tip | | |
|---|---|---|---|
| Parameter | 1 | 2 | 3 |
| $R_T$, nm | 40.5 ± 1.0 | 44.5 ± 1.0 | 75.2 ± 1.0 |
| α, ° | 52.6 ± 0.5 | 60.2 ± 0.5 | 83.0 ± 1.0 |
| $F_p$, nN (n = 30) | 9.7 ± 0.6 | 11.6 ± 1.0 | 22.3 ± 0.5 |
| $F_m$, nN (n = 30) | 16.6 ± 0.6 | 15.3 ± 0.3 | 31.8 ± 0.5 |
| $F_m'$, nN(n = 30) | ND | ND | 0.6 ± 0.1 |

$R_T$ and α, curvature radius and semivertical angle of the tip, respectively, determined as described. $F_p$ and $F_m'$, adhesion forces for naked tips imaging paraffin and mica, respectively. $F_m$, adhesion forces between DOSPA tips and mica surface. ND, not determined.

Figure 8:
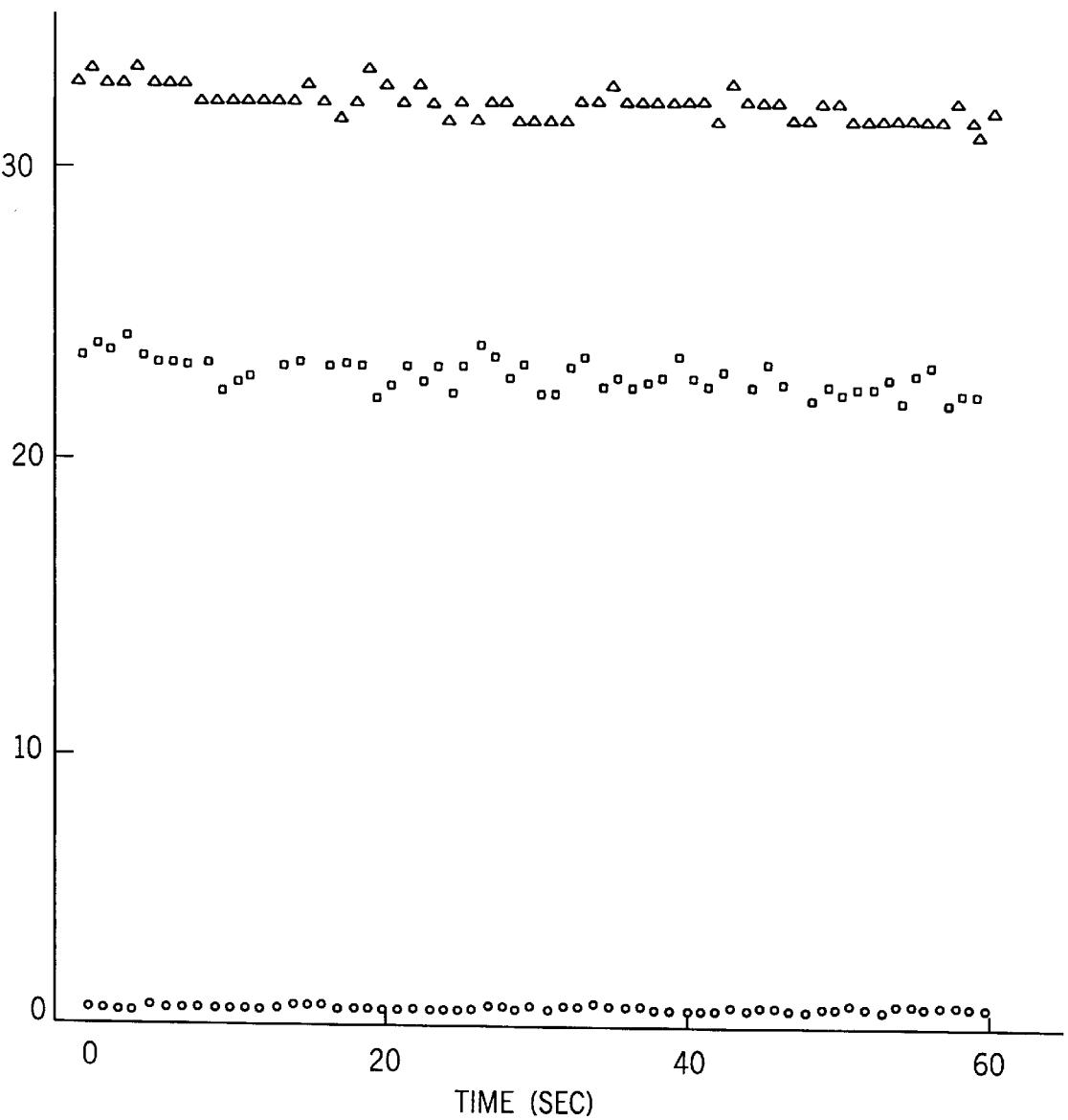
FIG. 8 shows stability of the DOSPA tip; the adhesion force was recorded as a criteria for the stability of the lipid tip with the DOSPA tip found to be stable imaging mica over time (top trace result was compared to the naked tip on mica (bottom trace) and the paraffin surface (middle trace); the adhesion forces recorded here were measured in water; and for the DOSPA tip, the final lipid concentration was 1.5 $\mu$g/ml.

The DOSPA tip 14 was stable as shown in FIG. 8 in which the adhesion forces of a naked tip 14 on mica (bottom line) and paraffin (middle line) and the DOSPA tip 14 on mica (top line) remained constant over one minute of sampling (31.7±0.4). Tips 14 coated with DOSPA were tested up to two hours and the adhesion forces remained constant (31.6 nN±0.6, n=150).

Figure 9A:
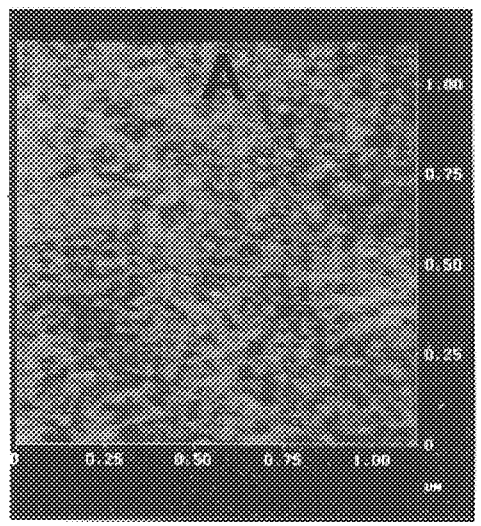
FIGS. 9A and B illustrate probing of the surface charges of lysozyme with a pG tip; a pG tip was used to image lysozymes on mica under phosphate buffer (10 mM sodium phosphate, 2 mM $CaCl_2$, 1 mM EDTA, pH 7.0)
Figure 9B:
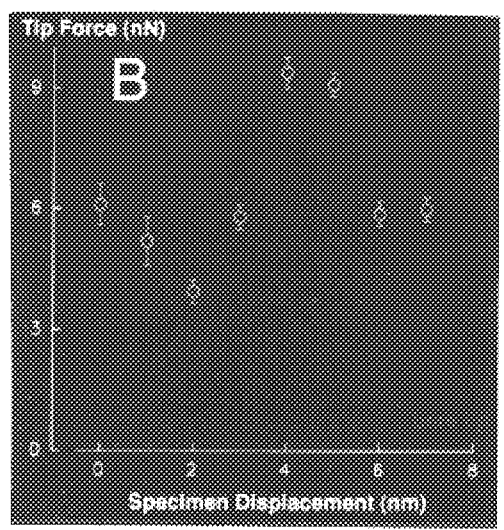
Figure 9C:
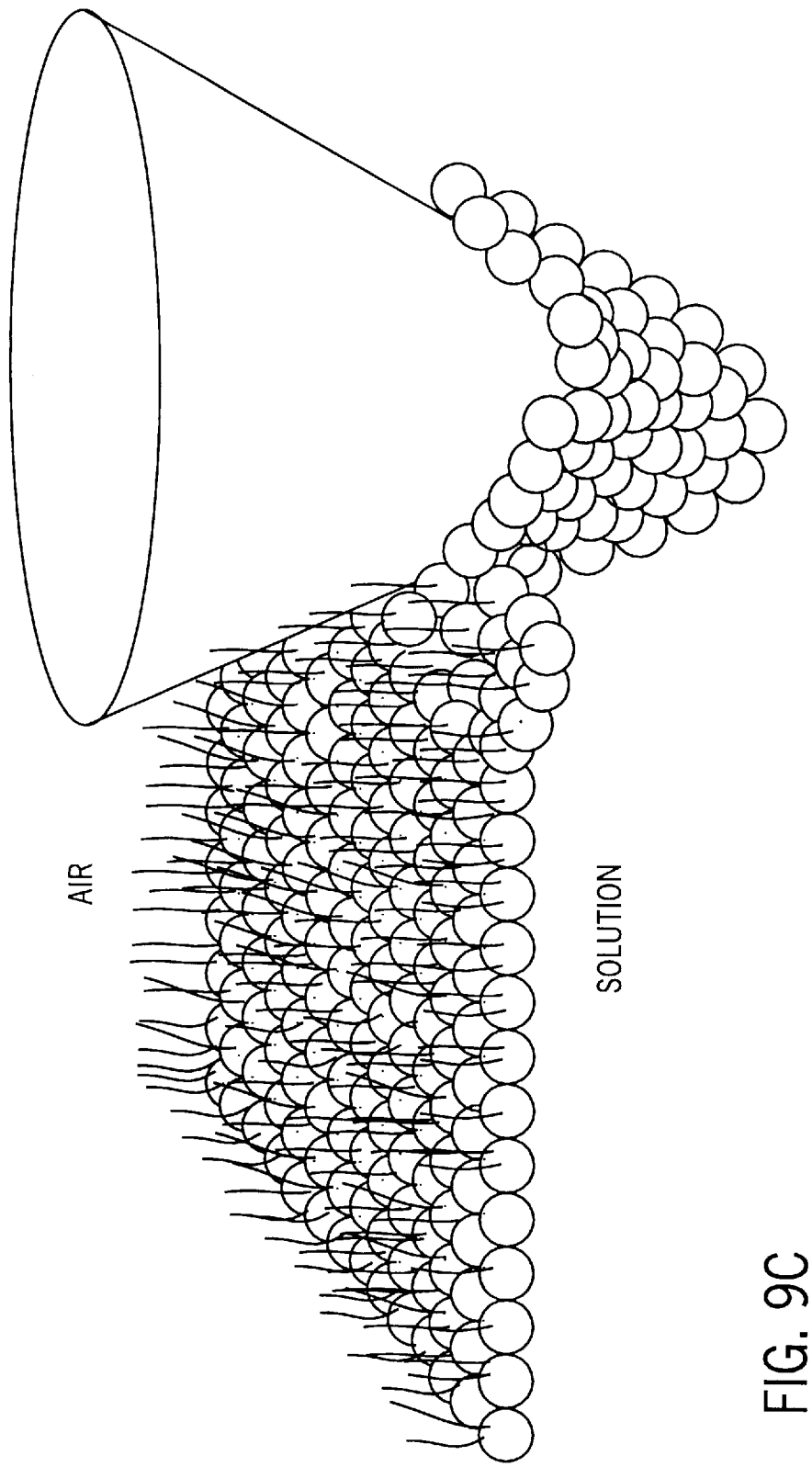
FIG. 9C shows a schematic representation of formation of a lipid tip.

Lysozymes adsorbed on mica were imaged in phosphate buffer using a pG tip (FIG. 9A). A spectrum of adhesion forces between 4 and 9 nN was recorded for the interaction between the pG tip 14 and the lysozymes which was much higher than the 0.5 nN obtained for the interaction between the naked tip 14 and lysozymes under the same conditions (FIG. 9B).

Surface charges on a nanometer scale in aqueous solutions can be readily analyzed by the method and apparatus of the invention. In evaluating the effect of surface charges, phospholipids were preferentially used to coat the tip 14 because: (1) different lipids with different charges could be applied to a tip sequentially or simultaneously; (2) they hold a promise as a base for the attachment of small chemicals such as drug molecules and small ligands and, more importantly, they will allow a substrate for reconstituting membrane proteins such as receptors and ion channels onto the tip 14 for pharmacological studies; and (3) the lipids could be removed from the tip 14, allowing different studies with the same cantilever tip 14 which eliminated the errors generated using tips with different tip geometry and cantilever spring constants.

The following nonlimiting discussion elaborates on the advantages and possible scientific bases of the observations. An electrical double layer can exist on the surface of a $Si_3N_4$ with ionizable groups resulting from partial oxidation including Si—OH and $Si_2$—NH. Depending on the pH and the electrolyte concentration, the surface charge of silicon nitride can be either positive, zwitterionic (zero net charge) or negative. At neutral pH, the net charges on the silicon nitride surface are near zero. The percentage of the charged to uncharged area of the tip surface rather than the nearly neutral charge status of the tip 14 is more important to the orientation of the phospholid molecules. Under our experimental conditions (pH, 6.0 and 7.0) the charged area may only represent a small percentage of the total surface since the adhesion force between an untreated tip 14 and a paraffin surface (nonpolar, hydrophobic) was ten times larger than the force measured on mica. This suggests the force of interaction between the tip 14 and the hydrophobic tails (nonpolar, hydrophobic) of the lipid molecules is much higher than the interaction between the tip and the head groups (polar, charged). The lipid molecules probably oriented themselves so that the hydrophobic tails were in contact with the tip 14, and the head groups were probably facing the aqueous solution (see FIG. 9C). This seems likely after the silicon nitride tip makes contact with a preformed lipid monolayer at the water-air interface. The structure can be more complicated or can become more complicated (trilayers, multilayers) as the result of interactions during imaging or the heterogeneity of binding to the tip 14. The bottom line, however, is that our measurements were reproducible over time and did not seem to be much affected by any potential or real change in the structure of the lipid molecules on the tip during imaging.

The attractive force between the DOSPA tip 14 and mica was probably due to coulombic and van der Waals forces. The adhesion force was due to coulombic, van der Waals forces, and more importantly, the force needed to break the salt bridges and hydrogen bonds formed between the lipid molecules on the tip and the specimen. The surface of mica is negatively charged in aqueous solution with a charge density of 0.009 $C/m^{-2}$ or 0.056 charges/$nm^2$ (27) due to the dissociation of the alkaline ions. A lipid molecule occupies an area of approximately 6 $nm^2$. Roughly one salt bridge could be formed for every three lipid molecules between the DOSPA on the tip 14 and mica.

Long-range electrostatic double layer repulsive force was observed for naked tip 14 imaging both mica and paraffin in aqueous solution. Strong attractive force observed for DOSPA tip 14 on mica was probably the sum of the long range electrostatic attractive force between the two oppositely charged surfaces and the short range van der Waals force.

Dications are known to be able to stabilize the monolayer structure. The effect of calcium on the adhesion force could result from a structural change of the lipid monolayer on the tip 14, since a change in the surface potential on both the specimen 16 and the monolayer surface of the tip 14 and a change in the dielectric constant of the media due to the addition of $Ca^{++}$ would only decrease the adhesion force.

A legitimate concern of using lipids rather than chemicals bound covalently to the tip 14 is whether the lipid molecules could be stripped off the tip 14 during scanning. Although possible, it did not seem to affect the use of the lipid tip 14 to monitor surface charges. We tested DOSPA-tips 14 on mica surface and the force remained almost unchanged for a fixed position over two hours of continuous monitoring of the adhesion force. Potentially, it might be of benefit if the lipids were pulled off the coated tip surface. The tips 14 could be designed to allow a ligand to be delivered to the protein receptor (the biospecific molecule 38) to initiate the biological function of the receptor molecule.

The adhesion force varied significantly when the pG tip 14 was used to interact with different particles of DEAE-Sephadex. This contrasts to the rather uniform force measurements when the DOSPA tip 14 interacted with different areas of mica. Such variation could result from nonuniform charge distribution on the sephadex beads or perhaps from changing areas of tip-specimen contact due to the uneven surface of the sephadex beads.

The variation of the adhesion forces in the experiment with lysozymes might reflect different areas of the molecule being probed. The force between the pG tip 14 and the protein receptor 38 might not necessarily result from interaction with a single molecule. However, it would be reasonable to believe that the molecule forming salt bridges with the pG tip 14 contributed more to the adhesion force than the other lysozyme molecules.

Whenever an SFM image is obtained in the presence of membrane lipids (such as cells, membrane proteins and artificial membranes) or other surfactant in aqueous solution, a charged form of the tip 14 can be formed from the interaction of the tip 14 with the monolayer of lipids or surfactant on the water-air interface. The danger is that we may be actually imaging the specimen 16 with a charged or surface active form of the tip 14 instead of the relatively inactive $Si_3N_4$ tip 14. As long as the lipids or surfactant existed in the aqueous solution, those amphipathic molecules could make the tip surface more active by either forming a monolayer or double layer depending upon the surface chemistry of the original tip 14. Energetically, it is a favorable process to make the tip surface more active since it would mean less structurally ordered water molecules around the hydrophobic tip 14 and an increase of entropy.

The idea of using amphipathic molecules to form charged tips can be generalized to the preparation of any other functionized tips. This can be a potentially powerful approach to studying biomolecules of physiologic and pharmacologic importance. As long as the materials used to modify the tip 14 have a hydrophobic tail and a polar head group, one could chemically modify the head group and attach other small chemical molecules to it. It should be practical to link drug molecules or ligand molecules as well as other agonist or antagonists to the lipids and prepare drug and ligand forms of the tip 14. One can, for example, use an amphipathic molecule which has a pKa around the pH to be measured to form an amphipathic tip and to access the surface pH in a nanometer scale.

Ultrasoft Probe

Figure 13A:
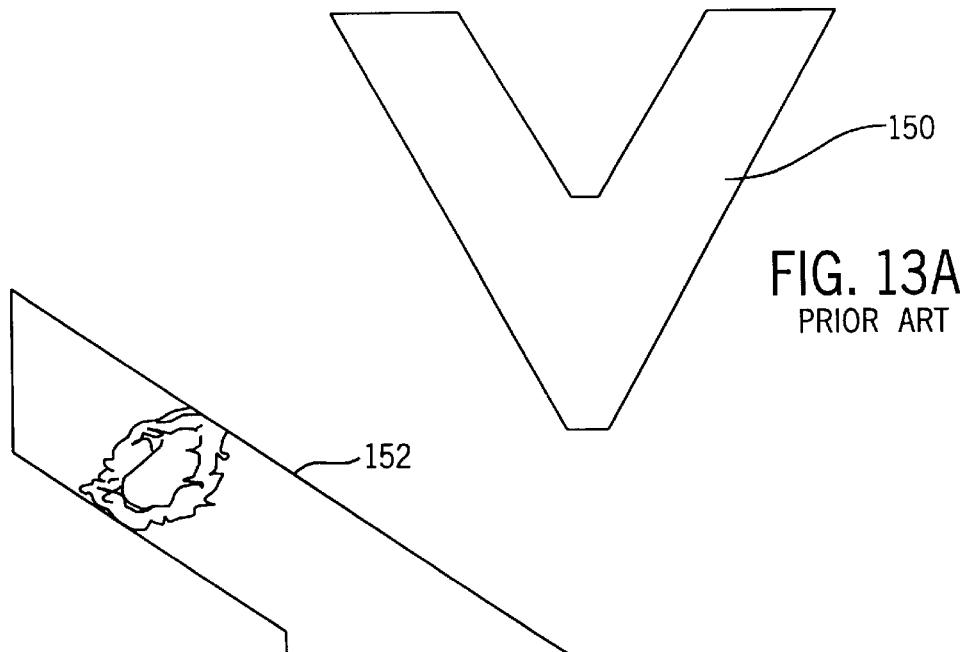
FIG. 13A shows a V-shaped AFM tip.

In use of the AFM 10, one can further enhance performance and develop new degrees of freedom by utilizing a modified ultrasoft probe tip. In FIG. 13A is illustrated a conventional $Si_3N_4$ tip 150. The ultrasoft probe tip is a very flexible cantilever tip used as the probe for imaging with the atomic (scanning) force microscope (AFM). The process that creates the ultrasoft probe tip 152 can use laser technology, or other means for introducing holes 154 or other cutouts 156 from the tip 152. (See FIGS. 13B–D.). These holes or spaces of various shapes in the tip 152 of the AFM 10 increase the flexibility of the tip material while retaining the necessary strength for imaging. The ultrasoft probe tip 152 will decrease the imaging probe's spring constant thereby decreasing the loading or tracking force. The decreased tracking force, in turn, will increase the spatial resolution of the AFM 10 and decrease the compression of and the potential mechanical damage to a biological specimen. The process can be used with $Si_3N_4$ as in our prototype or with other materials.

Spatial resolution depends importantly on a number of characteristics of the cantilever and its tip 152. The cantilevers 12 with lower spring constants certainly will reduce the loading force on the specimen 16 and will reduce the compression of and potential mechanical injury to biological specimens.

A strategy for improving resolution is to decrease the tracking force of the cantilever 12 with a force less than or equal to $10^{-10}$N which is thought to be in the range required for nonperturbed biological imaging. A reduced loading or tracking force will decrease the compression and potential mechanical damage of the biological or other fragile specimen 16.

The AFM imaging probe has been made of a variety of materials. The ultrasoft probe tip 152 is preferably made of $Si_3N_4$, the material most commonly used in commercially available cantilevers, but the tip 152 can be constructed from a large number of suitable materials such as refractory materials, metals, ceramics, semiconductors, superconductors, plastics and other materials. FIG. 13A shows the detail of the narrow short-legged "V" shaped or triangular portion of the cantilever tip that is the "spring" of the imaging probe. The legs are approximately 200 μm in length and 15 μm in width. The "spring" need not have this "V" shape, and the process described applies to all shapes and most materials. Further, the legs can have different spring constants, allowing friction force imaging or lateral force imaging taking advantage of different degrees of freedom.

Figure 13B:
FIGS. 13B–D show the V-shaped tip with various orifices in the tip generated by laser beam removal of material.
Figure 13C:
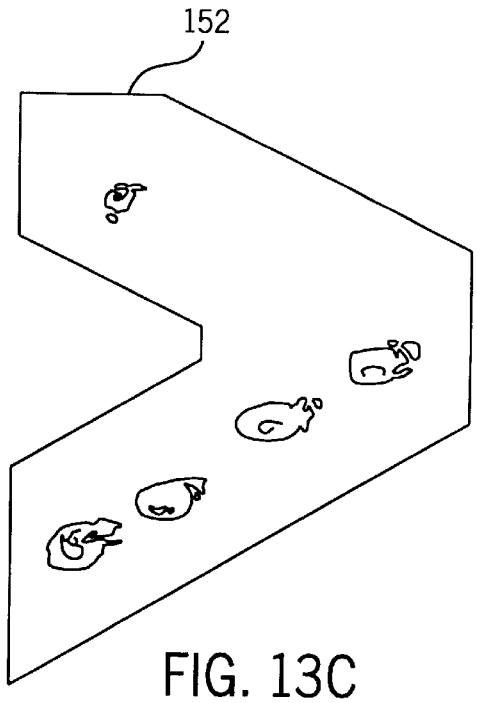
Figure 13D:
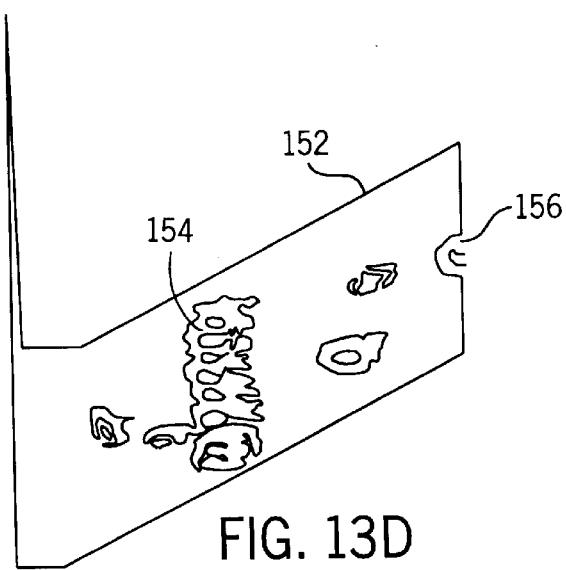

The principle employed was that the creation of holes in the legs of the AFM 10 would increase the flexibility of the tip 152, thereby decreasing the tracking force, while retaining the necessary strength for imaging. The process employed a commercially available to create the holes 154, 156 in both arms of the tip 152. FIGS. 13B–D shows the holes 154 created in the legs of the cantilever tip 152. In the top panel, a single large hole 154 has been created in each of the legs. A sequence of small holes 154 running the length of one of the legs is shown in the middle panel. The lower panel shows the holes 154 of several sizes, and shows the feasibility of accurately grouping a series if small holes 154 (note the sequence of eight small holes 154 created across the width of the leg). Some detail is lost in the xerox as compared to the original photographs.

Engineering principles can be used to design holes or spaces of various shapes in the tip 152 that will best increase flexibility and tracking force in whatever material is being used to construct the tip 152. Laser technology is one convenient means to realize these patterns in the material. The entire process can be automated for commercial application and efficiency.

The ability to provide variable spring constant tips 14 can reduce the hindering action of the fluid media during deflection of the cantilever 12. This will enhance sensitivity and allow imaging in high frequency. Other advantages include (1) the ability to cut narrow wells into the cantilever tip 14 enabling the deposition of a variety of chemical constituents, including pharmaceuticals, conductive materials, bacteria and viruses; (2) the removal of unnecessary extrusion parts of the cantilever 12 at the free end near the tip attachment; such extrusion parts can interfere with certain types of imaging; and (3) use in any kind of SFM of any specimen including imaging with less loading force and less specimen compression.

The following nonlimiting examples describe several exemplary methods of preparing and utilizing the invention of the Applicants.

EXAMPLE I

Figure 14A:
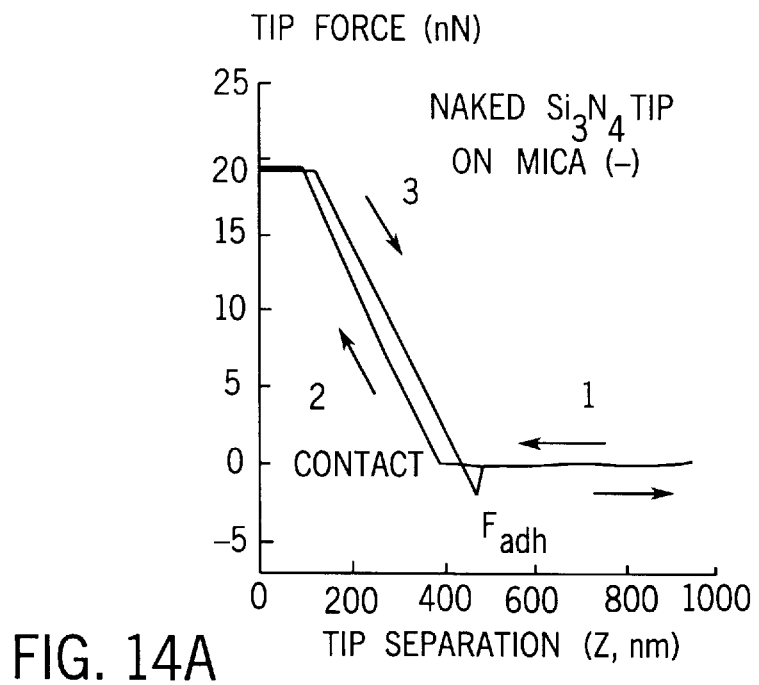
FIG. 14A shows a force versus distance curve generated by an AFM (a "force curve")

In the EPM 100, the specimen preferably moves while the cantilever remains fixed. In FIG. 14A, the approach of the sample (in this case negatively charged mica) towards the untreated $Si_3N_4$ tip is indicated by arrow 1 at force=0. On contact with the surface ("Contact"), the repulsive forces appear and increase (arrow 2) as a function of decreasing distance. When the specimen is withdrawn, the force decreases (arrow 3), and as the tip disengages from the surface, an adhesive force ($F_{adh}$) reflecting the interaction between tip and specimen (in this case about 2 nN) is noted. Note that this is beyond the force recorded at the initial contact between tip and specimen. This image was obtained while imaging in water. Dry imaging, not shown, has a tenfold higher adhesion force. The capillary force which is a prominent adhesion force in dry imaging disappears in fluid. A polycationic lipid, lipfectamin (3:1 mixture w/w of 2,3-dioleyloxy-N[2(sperminecarboxamido)ethyl]-N,N-dimetyhl-1-propanaminium trifluoroacetate and dioleoyl phosphatidylethanolamine) and a negatively charged lipid, (1-palmitoyl-2-oleoyl-L-α-phosphatidyl-DL glycerol) were used to alter the charge of the tip. In the following, the positively charged tip is termed "DOSPA-tip" and the negatively charged phosphatidylglycerol tip "pG tip." Lipids (0.5 ml, 10 mg/ml in $CHCL_3$) were dried in $N_2$ in a glass test tube and lyophilized overnight. Sodium phosphate buffer was used and the incubate was sonicated until the solution became semitransparent. A dry $Si_3N_4$ tip was immersed into a preformed lipid monolayer in the buffer-air interface. The surfaces scanned were mica (negatively charged) and DEAE-Sephadex (positively charged) beads.

Figure 14B:
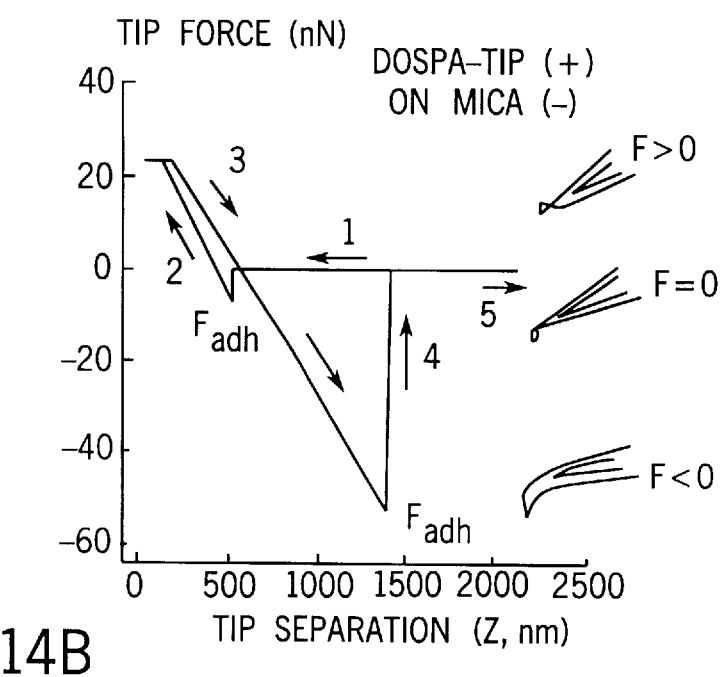
FIG. 14B shows the force curve and the bend of the cantilever at forces equal, greater and less than zero for a positively charged tip and negatively charged mica in water.
Figure 14C:
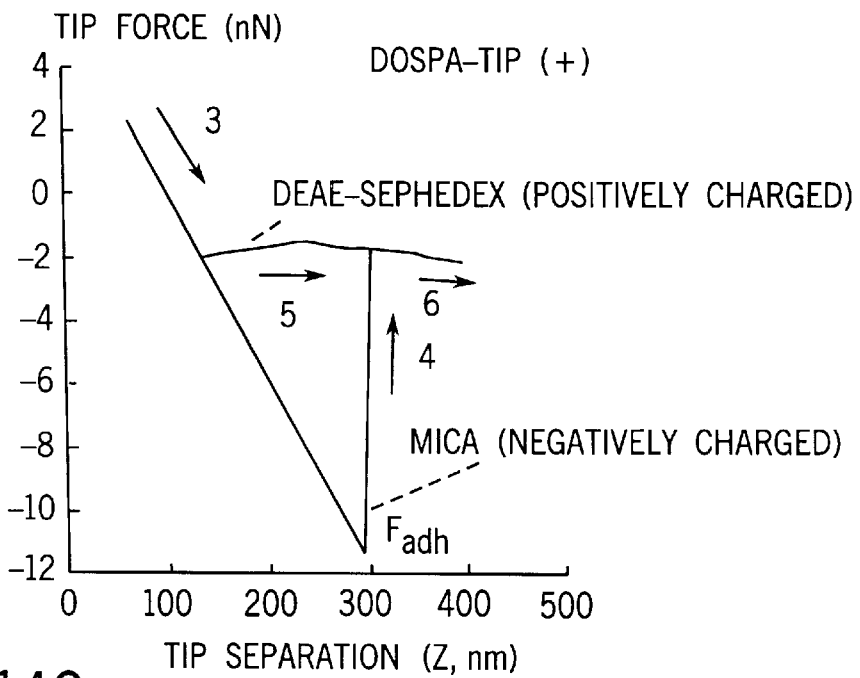
FIG. 14C shows forces generated by withdrawal of the sample from the cantilever and disengagement for a positively charged tip (DOSPA) and a positively charged surface (mica plus DEAE-Sephadex to render the scanned surface positive)

A positively charged DOSPA-tip was used to scan negatively charged mica in water. FIG. 14B shows the force curve as well as the bend of the cantilever at forces equal to, greater and less than 0. Note that at F=0, the cantilever is undeformed. As the distance between tip and surface decreases (arrow 1), the cantilever tip is suddenly pulled down by an attractive force with F<0 without much change in Z due to the attraction between the positively charged tip and the negatively charged surface. The maximum negative force at this point is defined as the attractive force ($F_{attr}$). As Z becomes smaller, the cantilever bends reflecting an increase in repulsive forces (arrow 2). On withdrawal, the tip force decreases (arrow 3) and a very large adhesion force is noted (some 25 times that noted for the untreated tip in FIG. 14A). Suddenly disengagement of the tip occurs with a return to F=0 (arrows 4 and 5). A positively charged DOSPA-tip was used to scan a positively charged surface (DEAE-Sephadex on mica). FIG. 14C shows only the forces generated by withdrawal of the sample from the cantilever and disengagement (i.e., arrows 1 and 2 depicted in FIGS. 14A and B are not shown). Note the large adhesion force when mica was the substrate prior to disengagement ($F_{adh}$) and the loss of most of the adhesion force when DEAE-Sephadex coated the substrate as indicated by the merging of arrow 3 into arrow 5.

Figure 14D:
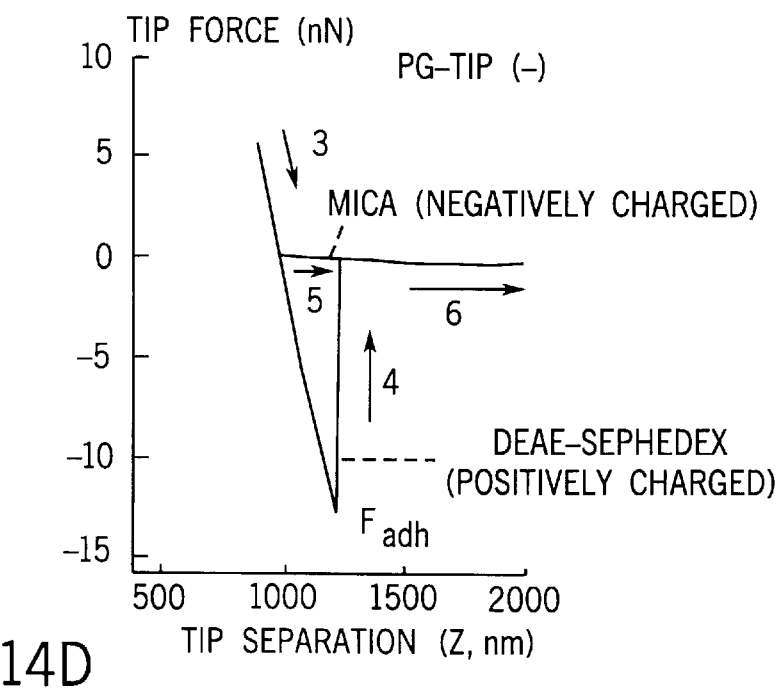
FIG. 14D shows only forces occurring on withdrawing the sample surface from the tip which was a negatively charged (pG tip) and negatively charged (mica) and a positively charged (DEAE-Sephadex treated)

Negatively charged pG tips were used to scan a negatively and positively charged surface (mica and DEAE-Sephadex treated mica, respectively). Opposite charges showed strong attractive and adhesive forces, and like charges decreasing or eliminating these forces. FIG. 14D shows again only the forces that occur on withdrawing the sample surface from the tip. Note the large adhesion force with the DEAE-Sephadex coated surface ($F_{adh}$ and the return to F=0 as indicated by arrow 4) and the lack of adhesion forces with mica (arrow 5).

Figure 14E:
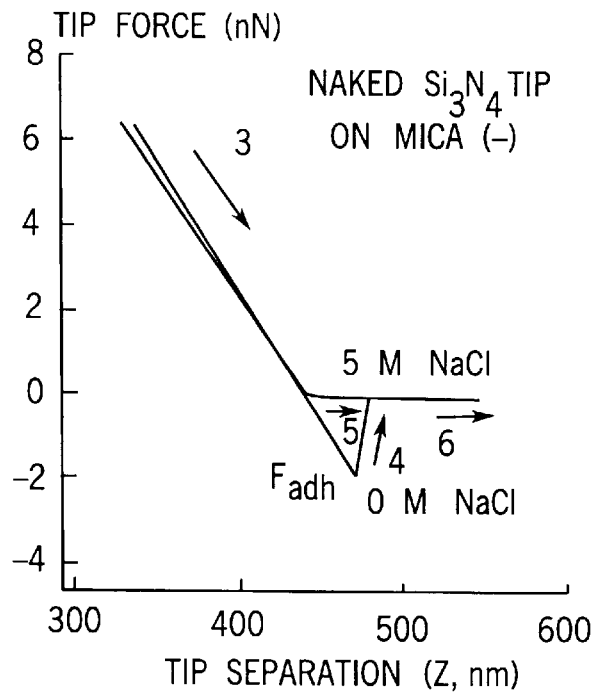
FIG. 14E shows only forces recorded on withdrawing the sample from the tip (untreated) imaging mica in the presence and absence of 5M NaCl.

The effect of NaCl on imaging mica was next analyzed. FIG. 14E shows only the forces recorded on withdrawing the sample from the tip. An untreated naked tip was used to image mica, and an adhesion force of about 2 nN was in NaCl-free solution. 5M NaCl eliminated the adhesion force (arrow 5 as compared to arrow 4). Our nonlimiting interpretation of the data is that coulombic and van der Waals forces are largely responsible for adhesion forces while imaging mica with an unmodified tip. The coulombic and van der Waals forces are dependent on the dielectric force of the solvent, and the 5M NaCl increases the dielectric constant, thereby decreasing the adhesion force.

Figure 14F:
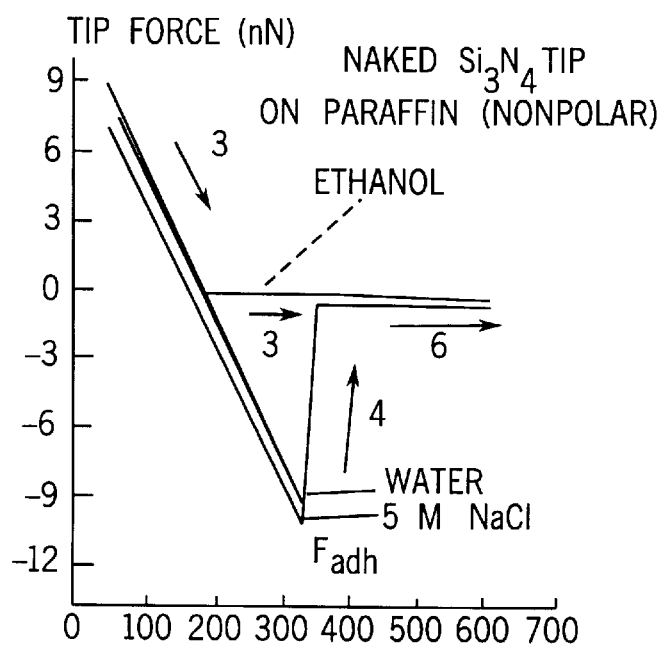
FIG. 14F shows only forces recorded on withdrawing sample from the tip with a nonpolar paraffin sample, imaging performed in ethanol, water and 5M NaCl.

The hydrophobic forces were next investigated. FIG. 14F shows only the forces recorded on withdrawing the sample from the tip. Here, nonpolar paraffin was the sample. Since paraffin is nonpolar, the usually dominant coulombic forces are eliminated, and the van der Waals forces are negligible as compared to the hydrophobic forces. A negatively charged pG tip was used and the imaging was performed in ethanol, water and 5M NaCl. No adhesion force was noted with ethanol (arrow 5), but large and virtually identical adhesion forces were noted with water and NaCl ($F_{adh}$ with a return to F=0 as indicated by arrow 4). Our interpretation is that the contact area is exposed to the medium as the tip is disengaging from the specimen. Ethanol is randomly oriented on nonpolar surfaces since it is also nonpolar, the decrease in entropy is small, and the adhesion force will be minimal. Water has to be ordered when in contact with a nonpolar, hydrophobic surface. With the increase in the nonpolar surface on disengagement of the cantilever, the entropy of water decreases since it must rearrange, and the adhesion force is large. Water and 5M NaCl produce virtually identical force curves on retraction, indicating that charge does not play an important role which is in contrast to what we observed imaging mica in 5M NaCl.

We then examined lysozymes adsorbed on a mica surface imaged in phosphate buffer using a pG tip. (See FIGS. 9A and 9B.) The images generated with the charged tips generally had a higher noise level as compared to the images obtained with bare tips. A spectrum of adhesion forces between 6 to 7 nN were recorded for the interaction between the pG tip and the lysozymes which were much higher than the 0.1 to 0.6 nN forces obtained for the interaction between naked tips and lysozymes under the same condition. The small fluctuation of the adhesion force probably reflected different residues of the lysozyme molecule being probed. The variations in force may also be due to the possibility of the probe touching a particular spot on the lysozyme and the presence of multiple regions with similar electrostatic states on the lysozyme.

Based on these results, (1) the cantilever is a very sensitive detector of fields and forces at a molecular level and the measurements were reproducible; (2) modification of the tip charge is feasible permitting sensing of attractive, repulsive and adhesive forces in the interactions between tips and surfaces of differing charge and act according to theory; (3) the modified tips are rugged; and (4) given the resolution obtained in our studies with porin channels and the ACHR, we can image and measure forces with sufficient resolution and sensitivity to attain the objectives outlined.

EXAMPLE II

The nicotinic acetylcholine receptor (ACHR) was investigated since it is one of the best characterized macromolecules involved in synaptic transmission, can be readily imaged and the approach should be generalizable to other receptors, channels and interesting biomolecules. The ACHR from the electric organ of Torpedo is probably the best characterized macromolecule involved in synaptic communication, both functionally and biochemically. A number of ligands are available, and the receptor closely resembles the ACHR of the neuromuscular junction. It is thought to have a 255 kDa pentameric comply with an α2:β:γ:δ stoichiometry, exists often as a dimer with a disulfide bridge between the δ subunits of the adjacent monomers or as a monomer. Each monomer has two nonequivalent acetylcholine binding sites. The two α subunits are associated with α-bungarotoxin (α-BTX) binding. The α subunits are nonequivalent, are not adjacent as deduced from electron microscopy (EM) and are separated by an angle of about 144° as deduced from immunoelectronmicroscopy. The current model for *T. California* as observed from the synaptic side has been deduced to be α:β:α:δ:γ

Figure 12A:
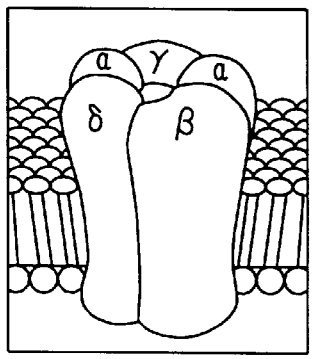
FIGS. 12A and B show models of nicotine ACHR receptor with the five subunits and active binding site for ACh.
Figure 12B:
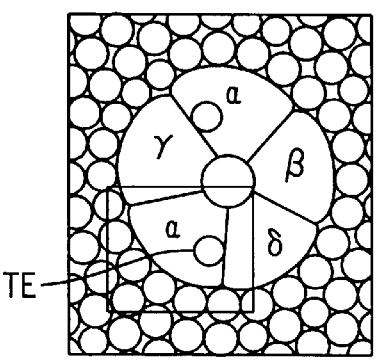
FIG. 12C shows an AFM image of the AChR showing the five subunits.
FIG. 12D shows two of the M2 segments of the ion channel with three negatively charged rings drawing positively charged ions through the channel.
Figure 12D:
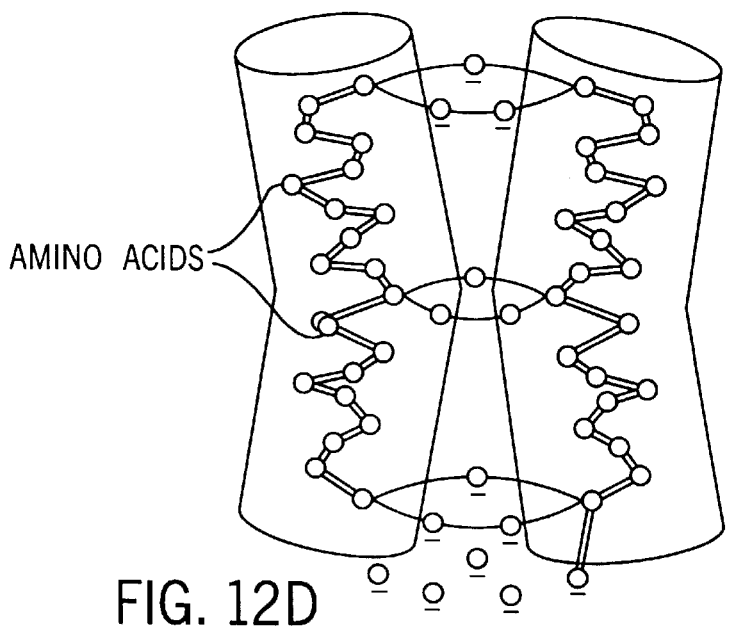
Figure 12C:
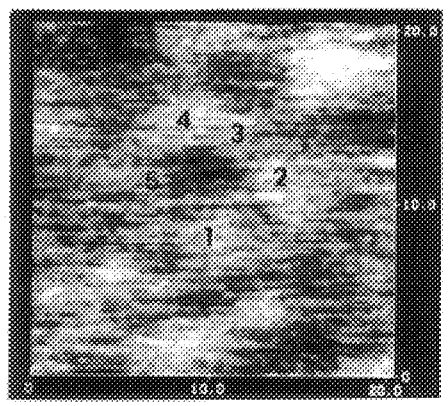

(counterclockwise) from immunoelectronmicroscopy and cross-linking experiments as well as from analogy to EM studies of *T. mannorata*. When coexpressed in fibroblasts, however, α and β subunits do not associate effectively and so do not bind ligand, whereas α-δ and α-γ do. The γ subunit has a binding site for wheat germ agglutinin (WGA). Several arrangements for the subunits have been proposed, but the actual arrangement is uncertain. FIGS. 12A and B show the accepted arrangement of the subunits, the location of the ACh binding site and the ion channel in the center, and FIG. 12C is an AFM image of the AChR using an unmodified cantilever tip. The pentameric structure of the ACHR receptor is visible, and the intramolecular pore that enables the protein to conduct cations is clearly identified. Of the five subunits, three (marked as 1, 2, and 4) are bulkier than the other two. The receptor has a diameter of about 113 Å with a diameter at the mouth of about 40 Å. Of note is that the quaternary structure of the ACHR shown here has higher resolution than the structural data obtained by EM and x-ray crystallography. Acetylcholine is attached to a neutral lipid which, in turn, is used to coat and modify the cantilever tip. A large attractive and adhesive force was observed with the EPM 100 allowing identification of the ACHR and, subsequently, the subunit that contains the binding site. We observed that: (1) the cantilever tip is a very sensitive detector of molecular forces (e.g., repulsive, attractive and adhesion forces); (2) modification of the tip charge is feasible permitting sensing of attractive as well as repulsive and adhesion forces; (3) the interactions between the tips of differing charge and surfaces of differing charge are observable and act according to theory; (4) the importance of hydrophobicity for a given environment can be assessed by using a nonpolar surface; (5) the modified tips are rugged; (6) the results are reproducible; and (7) we can assess the morphology of a biomolecule (the ACHR) with sufficient resolution to develop the biospecific probe.

EXAMPLE III

Figure 10:
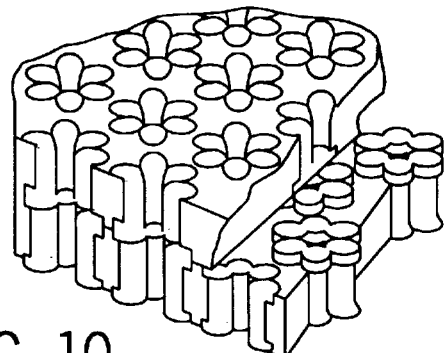
FIG. 10 shows a model of cellular gap junction structure.
Figure 11A:
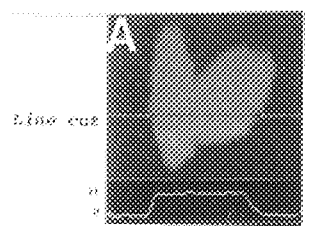
FIGS. 11A–D illustrate atomic force dissection responses for increasing forces of 0.8 nN, 3.1 nN, 10.1 nN and a repeat scan at 10.1 nN
Figure 11B:
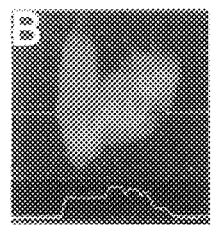
Figure 11C:
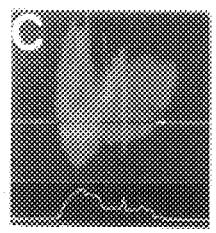
Figure 11D:
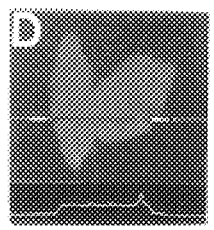
Figure 11E:
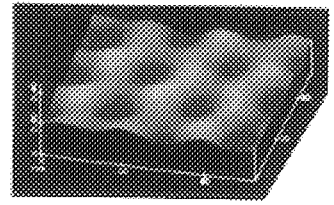
FIG. 11E shows the line cut for each image.

The biological gap junction was investigated by performing AFM on gap junctions of a membrane (model shown of gap junction in FIG. 10). Increasing forces of 0.8 nN, 3.1 nN, 10.1 nN and a repeat scan of 10.1 nN were made (see FIGS. 11A–E). The field size used was 1.5×1.5 microns and the line cut of each image is shown in FIG. 11E. These line cuts show that the top membrane is removed at higher forces, reducing the thickness of the structure to about half the original value (15 nM to 7 nM in FIG. 11D). This shows the "docking" portion of the gap junction and the six hexagonal array is apparent from FIG. 11E.

While preferred embodiments of the invention have been shown and described, it will be clear to those skilled in the art that various changes and modifications can be made without departing from the invention in the broader aspects as set forth in the claims provided hereinafter.

What is claimed in:

1. An atomic force microscope for probing a biological specimen, comprising:
    a cantilever arm having a cantilever tip attached thereto, said cantilever tip including means for identifying biomolecules on the surface of said biological specimen with said means comprising an amphipathic molecule coupled to said cantilever tip for interaction with a biological site of interest;
    means for providing a laser beam for reflecting off said cantilever tip;
    means for scanning said cantilever tip relative to said biological specimen; and
    means for detecting said reflected laser beam.

2. The atomic force microscope as defined in claim 1 wherein said amphipathic molecule is selected from the group consisting of small lipid molecules, detergents, and large macromolecules.

3. The atomic force microscope as defined in claim 2 wherein said amphipathic molecules are selected from the group consisting of charged molecules and zwitterions.

4. The atomic force microscope as defined in claim 1 wherein said cantilever tip comprises at least one leg portion and at least one of a hole and a cutout in said leg portion.

5. The cantilever tip as defined in claim 4 wherein said leg portion includes a plurality of holes.

6. The cantilever tip as defined in claim 5 wherein said cantilever tip comprises at least two of said leg portions.

7. The cantilever tip as defined in claim 6 wherein said leg portions have different patterns of said holes.

8. The atomic force microscope as defined in claim 1 wherein said tip comprises a ceramic material.

9. The atomic force microscope as defined in claim 1 wherein said amphipathic molecule has a pKa near a pH to be measured.

10. An atomic force microscope for probing a biological specimen, comprising:
    a cantilever arm having a cantilever tip attached thereto, said cantilever tip including means for identifying biomolecules on the surface of said biological specimen wherein said means for identifying biomolecules comprises at least one of receptor molecules coated onto said cantilever tip, a zwitterion liquid coating, amphipathic liquids having protein donors, amphipathic liquids having protein acceptors, and hydrophobic molecules;
    means for providing a laser beam for reflecting off said cantilever tip;
    means for scanning said cantilever tip relative to said biological specimen; and
    means for detecting said reflected laser beam.

11. An atomic force microscope for probing a biological specimen, comprising:
    a cantilever arm having a cantilever tip attached thereto wherein said cantilever tip is coated with photoactivated charges, said cantilever tip including means for identifying biomolecules on the surface of said biological specimen;
    means for providing a laser beam for reflecting off said cantilever tip;
    means for scanning said cantilever tip relative to said biological specimen; and
    means for detecting said reflected laser beam.

* * * * *

UNITED STATES PATENT AND TRADEMARK OFFICE
CERTIFICATE OF CORRECTION

PATENT NO. : 5,874,668

DATED : February 23, 1999

INVENTOR(S) : Xu et al.

It is certified that error appears in the above-identified patent and that said Letters Patent is hereby corrected as shown below:

In Column 1, line 3, insert -- The United States Government has certain rights in this invention pursuant to Grant # HL21788 from the National Institutes of Health to the University of Chicago --.

Signed and Sealed this

Third Day of August, 1999

Attest:

Q. TODD DICKINSON

Attesting Officer

Acting Commissioner of Patents and Trademarks